US011676617B2

(12) United States Patent
Miyamoto et al.

(10) Patent No.: US 11,676,617 B2
(45) **Date of Patent: *Jun. 13, 2023**

(54) ACOUSTIC NOISE SUPPRESSING APPARATUS AND ACOUSTIC NOISE SUPPRESSING METHOD

(71) Applicant: PANASONIC INTELLECTUAL PROPERTY MANAGEMENT CO., LTD., Osaka (JP)

(72) Inventors: Masanari Miyamoto, Fukuoka (JP); Naoya Tanaka, Fukuoka (JP); Hiromasa Ohashi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/472,171

(22) Filed: Sep. 10, 2021

(65) Prior Publication Data

US 2021/0407528 A1 Dec. 30, 2021

Related U.S. Application Data

(63) Continuation of application No. 16/841,199, filed on Apr. 6, 2020.

(30) Foreign Application Priority Data

Apr. 8, 2019 (JP) ................................ 2019-073493

(51) Int. Cl.
*G10L 15/20* (2006.01)
*G10L 21/0208* (2013.01)
*G10K 11/16* (2006.01)

(52) U.S. Cl.
CPC .......... *G10L 21/0208* (2013.01); *G10K 11/16* (2013.01); *G10K 2210/1282* (2013.01)

(58) Field of Classification Search
CPC .......... G06F 17/30994; G10L 21/0208; G10K 11/16; H04M 9/82; H04S 3/008
(Continued)

(56) References Cited

U.S. PATENT DOCUMENTS

2009/0154692 A1* 6/2009 Sakuraba .............. H04M 9/082 379/406.06
2012/0163580 A1 6/2012 Fujita et al.
(Continued)

FOREIGN PATENT DOCUMENTS

JP 2006-039447 2/2006
JP 2009-216835 9/2009
(Continued)

OTHER PUBLICATIONS

Japanese Office Action dated Jul. 9, 2019 issued in Japanese Patent Application No. 2019-073493 along with English translation. Cited and considered in parent application.
(Continued)

*Primary Examiner* — Md S Elahee
(74) *Attorney, Agent, or Firm* — Greenblum & Bernstein, P.L.C.

(57) ABSTRACT

An acoustic noise suppressing apparatus includes a sound pickup circuit, a first and second suppression circuits, and an output signal selection circuit. The sound pickup circuit picks up sound. The first suppression circuit processes the sound, in which the first suppression circuit is configured to calculate a first suppression sound signal in which acoustic noise is suppressed from the sound by using a first algorithm suitable for multiple sound sources. The second suppression circuit processes the audio signal in parallel with the first suppression circuit, in which the second suppression circuit is configured to calculate a second suppression sound signal in which acoustic noise is suppressed from the sound signal by using a second algorithm suitable for a single sound source. The output signal selection circuit outputs only one of the first suppression audio signal and the second suppression audio signal.

17 Claims, 28 Drawing Sheets

(58) Field of Classification Search
USPC .......................................................... 704/233
See application file for complete search history.

(56) References Cited

U.S. PATENT DOCUMENTS

| | | | | |
|---|---|---|---|---|
| 2013/0197905 | A1* | 8/2013 | Sugiyama ............. | H04M 9/082 704/226 |
| 2015/0179160 | A1 | 6/2015 | Wu et al. | |
| 2016/0255434 | A1* | 9/2016 | Yamamoto .............. | H04S 3/008 381/305 |
| 2020/0074015 | A1 | 3/2020 | De Vansa Vikramaratne | |

FOREIGN PATENT DOCUMENTS

| | | |
|---|---|---|
| JP | 2012-134923 | 7/2012 |
| JP | 2015-511330 | 4/2015 |
| JP | 2019-020678 | 2/2019 |

OTHER PUBLICATIONS

Japanese Decision to Grant dated Nov. 12, 2019 issued in Japanese Patent Application No. 2019-073493 along with English translation. Cited and considered in parent application.

* cited by examiner

ACOUSTIC NOISE SUPPRESSING APPARATUS AND ACOUSTIC NOISE SUPPRESSING METHOD

CROSS REFERENCE TO RELATED APPLICATIONS

This application is a Continuation of U.S. patent application Ser. No. 16/841,199, filed on Apr. 6, 2020, which is based upon and claims the benefit of Japanese Application No. 2019-73493 filed on Apr. 8, 2019. The disclosure of each of these documents, including the specification, drawings, and claims, is incorporated herein by reference in its entirety.

BACKGROUND OF THE INVENTION

1. Field of the Invention

The present disclosure relates to an acoustic noise suppressing apparatus and an acoustic noise suppressing method for suppressing acoustic noise in an environment.

2. Description of the Related Art

For example, a conversation support system for a relatively large vehicle in which a plurality of (for example, three or more rows of) seats are arranged in a front-rear direction, such as a minivan, a wagon car, and a one-box car, is studied.
Specifically, a mechanism that uses a microphone and a speaker installed in each seat to transmit sound such that a driver seated on a driver's seat and an occupant seated on a back seat (for example, a friend of the driver) can have a smooth conversation is studied as the conversation support system.

In the conversation support system, a sound uttered by the driver is picked up by the microphone installed in the driver's seat and output from the speaker installed in the rear seat. Accordingly, it is easier for the rear occupant to hear the driver's sound even when the vehicle travels on an unpaved road where the vehicle is likely to vibrate or in a noisy city. In addition, since the sound uttered by the rear occupant is picked up by the microphone installed in the rear seat and output from the speaker installed in the driver's seat, the driver can easily hear the sound of the rear occupant.

In such a conversation support system, a reproduced sound output from the speaker may be picked up by a microphone, and utterances of a plurality of persons may be simultaneously picked up by the microphone. In this case, the microphone picks up a sound that is different from the current sound of the person whose sound is desired to be picked up. If such a sound is output from the speaker as it is, it may be difficult to hear the sound and have a smooth conversation. For this reason, it is desired to improve the quality (sound quality) of the sound output from the speaker.

As a technique for solving the problem, a sound removing apparatus as described in JP-A-2009-216835 (Patent Literature 1) is known. In this sound removing apparatus, occupant arrangement patterns are assumed in advance as situations in a vehicle interior, and a sound transmission characteristic is measured for each arrangement pattern. Then, a sound in an audio signal output from the speaker is estimated and removed by using the respective transmission characteristics obtained through the measurement and stored in a memory or the like. According to the sound removing apparatus, the sound can be removed or suppressed as long as the occupant arrangement satisfies any of the arrangement patterns.

Patent Literature 1: JP-A-2009-216835

SUMMARY OF THE INVENTION

However, in the sound removing apparatus described in JP-A-2009-216835, it is necessary to measure the sound transmission characteristic in advance for each conceivable occupant arrangement pattern and store the sound transmission characteristic in the memory or the like as the situation in the vehicle interior. The sound transmission characteristic is changed greatly depending on other factors of the occupant arrangement pattern in the vehicle (for example, the height, the body shape of the occupant, the occupant falling down on the seat, and the occupant opening or closing a window or a door of the vehicle). It is also assumed that the number of talkers in a conversation is not constant. Therefore, with the configuration in JP-A-2009-216835, it is difficult in reality to prepare the sound transmission characteristics in all situations in the vehicle, taking into account not only the arrangement patterns of the occupants but also environmental variations in the vehicle and the number of persons who talk simultaneously.

Further, there is a case where the sound transmission characteristic in a sound field in the vehicle greatly changes (in other words, there is a sudden variation in the environment), for example, when the occupant opens or closes the window, fails down on the seat or moves the face greatly during traveling. In these cases, the sound transmission characteristic in the sound field in the vehicle deviates from the sound transmission characteristic prepared in advance. That is, with the configuration of JP-A-2009-216835 in which the transmission characteristic is prepared in advance, it is difficult to follow the change in the transmission characteristic, so that the sound cannot be sufficiently removed or suppressed, and the sound quality of the sound output from the speaker deteriorates.

The present disclosure is proposed in view of the above situation in the related art, and a non-limited object thereof is to provide an acoustic noise suppressing apparatus and an acoustic noise suppressing method for suppressing deterioration in sound quality of an output sound even when there are sudden environmental variations or simultaneous utterances by talkers.

An aspect of the present disclosure provides an acoustic noise suppressing apparatus which is configured to suppress acoustic noise included in individual audio signals in which utterances of a plurality of persons in a closed space such as a vehicle interior or a conference room are picked up by a plurality of sound pickup units disposed correspondingly to the persons in the closed space, the acoustic noise suppressing apparatus including: a first suppression unit configured to output a first suppression audio signal in which the acoustic noise is suppressed by subtracting a first pseudo noise signal from the picked up audio signal, the first pseudo noise signal being generated based on a first delay signal obtained by delaying a sound source signal of the acoustic noise by a time calculated based on a distance between a sound source of the acoustic noise and the sound pickup unit and a first filter updated by a first algorithm which is valid when a plurality of talkers are talking; a second suppression unit configured to output a second suppression audio signal in which the acoustic noise is suppressed by subtracting a second pseudo noise signal from the picked up audio signal, the second pseudo noise signal being generated based on a second delay signal obtained by delaying a sound source signal of the acoustic noise by a time calculated based on a distance between a sound source of the acoustic noise and the sound pickup unit and a second filter updated by a second algorithm which is valid when one talker is talking; and an output signal selection unit configured to output a suppressed audio signal of which it is determined that the acoustic noise is suppressed among the first suppressed audio signal and the second suppressed audio signal.

Another aspect of the present disclosure provides an acoustic noise suppressing method of suppressing acoustic noise included in individual audio signals in which utterances of a plurality of persons in a closed space such as a vehicle interior or a conference room are picked up by a plurality of sound pickup units disposed correspondingly to the persons in the closed space, the acoustic noise suppressing method including: a first suppression step of outputting a first suppression audio signal in which the acoustic noise is suppressed by subtracting a first pseudo noise signal from the picked up audio signal, the first pseudo noise signal being generated based on a first delay signal Obtained by delaying a sound source signal of the acoustic noise by a time calculated based on a distance between a sound source of the acoustic noise and the sound pickup unit and a first filter updated by a first algorithm which is valid when a plurality of talkers are talking; a second suppression step of outputting a second suppression audio signal in which the acoustic noise is suppressed by subtracting a second pseudo noise signal from the picked up audio signal, the second pseudo noise signal being generated based on a second delay signal obtained by delaying a sound source signal of the acoustic noise by a time calculated based on a distance between a sound source of the acoustic noise and the sound pickup unit and a second filter updated by a second algorithm which is valid when one talker is talking; and a selection step of outputting a suppressed audio signal of which it is determined that the acoustic noise is suppressed among the first suppressed audio signal and the second suppressed audio signal.

According to the present disclosure, even when there is a sudden environmental change or the plurality of persons talk simultaneously, or the like, it is possible to suppress deterioration in the sound quality of the output sound.

DETAILED DESCRIPTION OF THE EXEMPLARY EMBODIMENTS

Hereinafter, embodiments specifically disclosing an acoustic noise suppressing apparatus and an acoustic noise suppressing method according to the present disclosure will be described in detail with reference to the drawings as appropriate. An unnecessary detailed description may be omitted. For example, a detailed description of a well-known matter or a repeated description of substantially the same configuration may be omitted. This is to avoid unnecessary redundancy in the following description and to facilitate understanding by those skilled in the art. It should be noted that the accompanying drawings and the following description are provided for a thorough understanding of the present disclosure by those skilled in the art, and are not intended to limit the claimed subject matter.

The acoustic noise suppressing apparatus according to each embodiment is applied to, for example, an in-vehicle conversation support system that supports conversation between occupants in a vehicle interior. However, it goes without saying that the acoustic noise suppressing apparatus of each of the following embodiments is not limited to being applied to the above-described in-vehicle conversation support system.

First Embodiment

[Outline of Conversation Support System]

Figure 1:
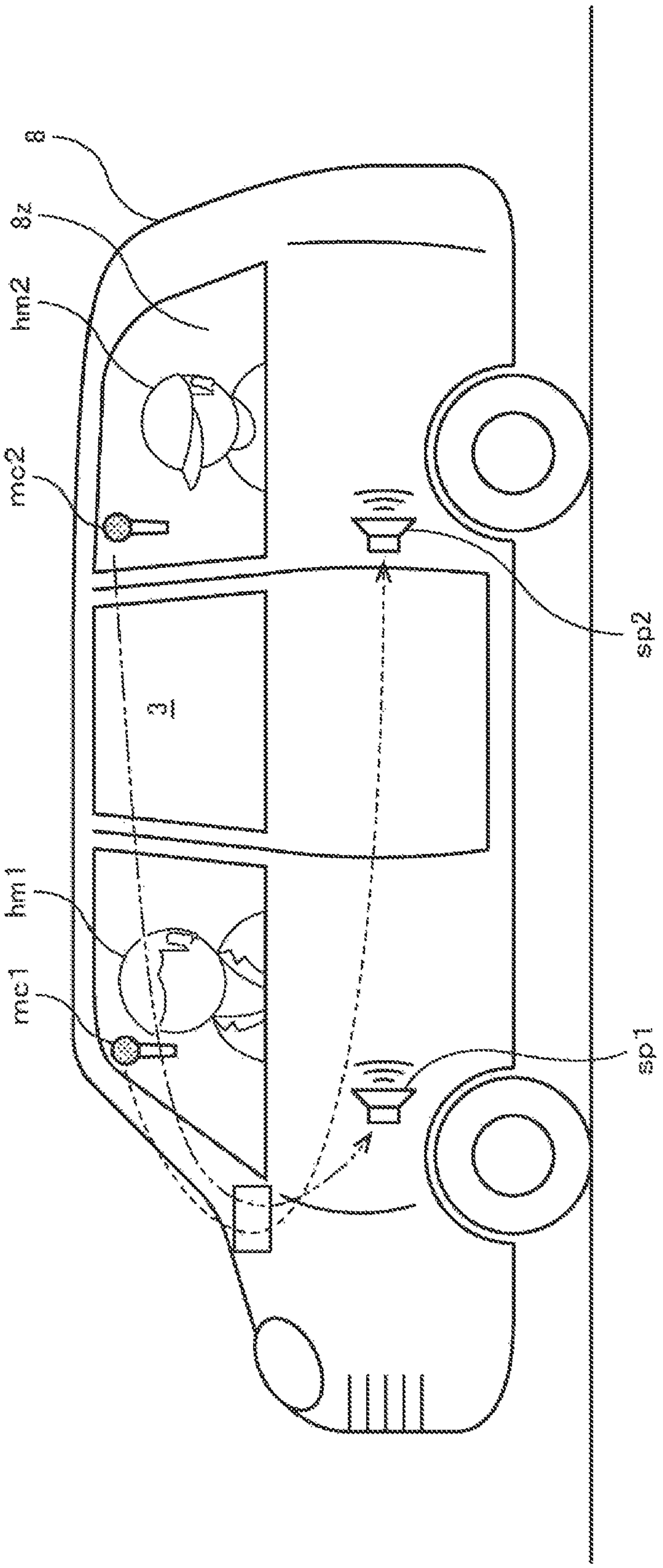
FIG. 1 is a diagram showing an outline of a conversation support system 3 according to a first embodiment.

FIG. 1 is a diagram showing an example of a conversation support system 3 according to a first embodiment. The conversation support system 3 in the first embodiment is mounted on a vehicle 8, and includes a microphone mc1 and a speaker sp1 disposed near a driver's seat, a microphone mc2 and a speaker sp2 disposed near a rear seat, and an acoustic noise suppressing apparatus 05 (not shown in FIG. 1).

The microphone mc1 picks up a sound uttered by a driver hm1. The speaker sp1 outputs a sound to the driver hm1. The microphone mc2 pies up a sound uttered by an occupant hm2. The speaker sp2 outputs a sound to the occupant hm2. The microphone mc1 and the microphone mc2 are examples of a sound pickup unit, and may be either a directional microphone or a non-directional microphone. The speaker sp1 and the speaker sp2 are examples of a sound output unit, and may be either a directional speaker or a non-directional speaker.

The acoustic noise suppressing apparatus 05 suppresses acoustic noise generated in the vehicle 8. Here, the acoustic noise means a sound other than the sound to be picked up by the microphone mc1. In the first embodiment, a sound output by another speaker is assumed as the acoustic noise. Details of the acoustic noise suppressing apparatus 05 will be described later.

[Transmission Environment of Sound]

Figure 2:
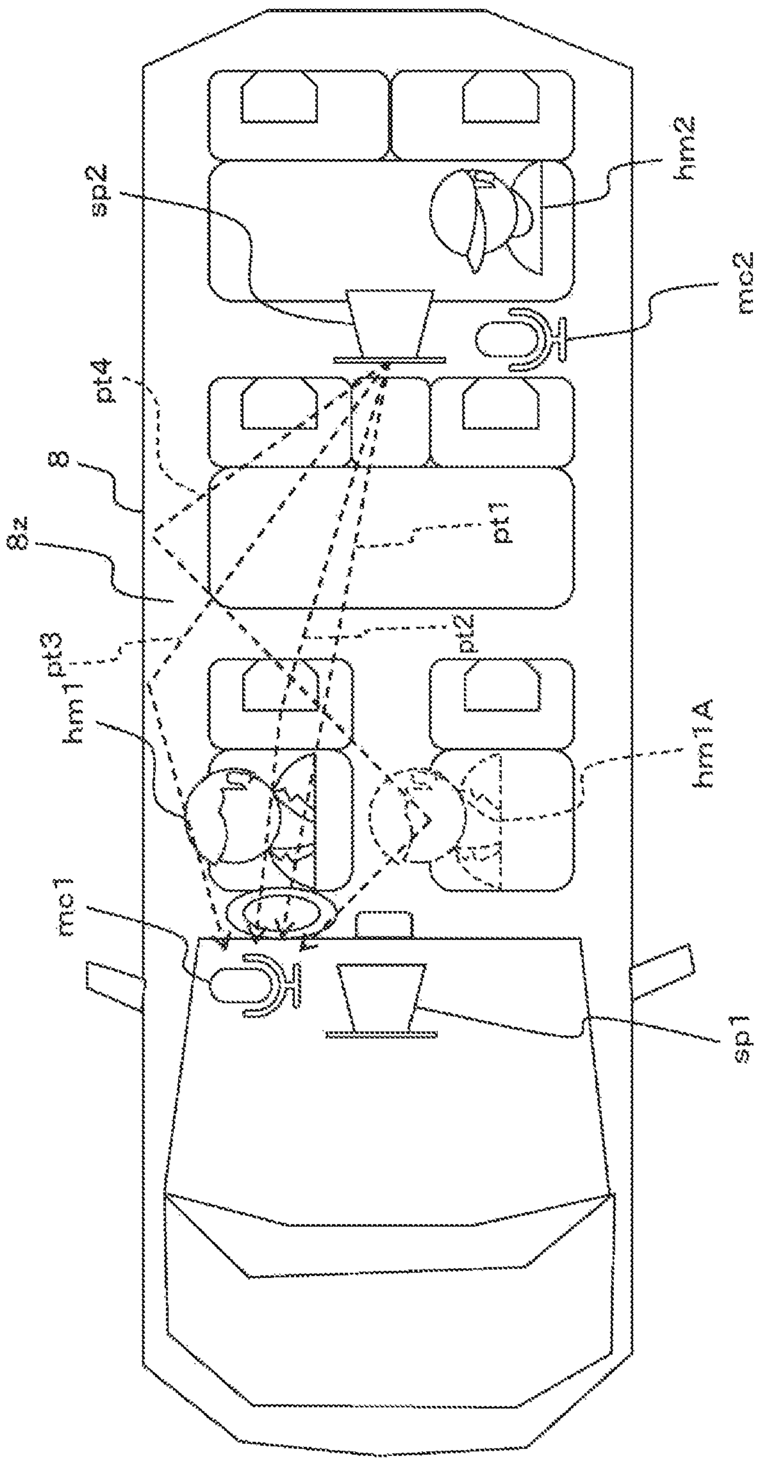
FIG. 2 is a diagram showing an example of transmission paths of direct waves and indirect waves in a vehicle interior according to the first embodiment.

FIG. 2 is a diagram showing an example of sound transmission paths in a vehicle interior 8*z* in the first embodiment. The sound uttered by the driver hm1 is picked up by the microphone mc1. Here, when a reproduced sound is also output from the speaker sp2, the reproduced sound output from the speaker sp2 is also picked up by the microphone mc1 simultaneously with the sound of the driver hm1. In the example shown in FIG. 2, the reproduced sound output from the speaker sp2 is picked up as acoustic noise by the microphone mc1 directly or indirectly via transmission paths pt1 to pt4 in the vehicle interior 8*z*.

The transmission path pt1 is a transmission path of a direct wave in which the sound output from the speaker sp2 reaches the microphone mc1 directly. The transmission path pt2 is a transmission path of an indirect wave in which the sound output from the speaker sp2 is reflected by a door on a driver seat side and reaches the microphone mc1. The transmission path pt3 is a transmission path of an indirect wave in which the sound output from the speaker sp2 is reflected by a ceiling in the vehicle interior 8*z* and reaches the microphone mc1. The transmission path pt4 is a transmission path of an indirect wave in which the sound output from the speaker sp2 is reflected by a door on a rear seat side and a side box of the driver's seat and reaches the microphone mc1. The transmission paths shown in FIG. 2 are examples, and the sound output from the speaker sp2 is picked up by the microphone mc1 through various transmission paths. For the sake of simplicity, the transmission paths between the speaker sp2 and the microphone mc1 are assumed to be pt1 to pt4, but it goes without saying that there are various transmission paths in reality. Further, an integration of these transmission paths (pt1 to pt4 and various transmission paths not shown) is the transmission characteristic in the vehicle interior 8*z* in the first embodiment. The transmission characteristic may be changed. For example, as in the case of a driver hm1A in FIG. 2, when the driver hm1 moves largely, the transmission path pt4 disappears or is changed greatly, and the transmission characteristic of the sound field in the vehicle interior 8*z* is changed. In addition, the transmission characteristic in the vehicle interior 8*z* may be changed due to various factors such as opening the window.

In the first embodiment, the sounds picked up by the microphone mc1 include not only the sound uttered by the driver hm1 but also the reproduced sound of the speaker sp2 reaching the microphone mcg via the transmission paths pt1 to pt4. When the sounds picked up by the microphone mc1 are output from the speaker sp2 directly, the reproduced sound output from the speaker sp2 includes acoustic noise (reproduced sound of the speaker sp2). The acoustic noise suppressing apparatus 05 improves sound quality by suppressing the acoustic noise generated in such a situation.

[Configuration of Acoustic Noise Suppressing Apparatus]

Figure 3:
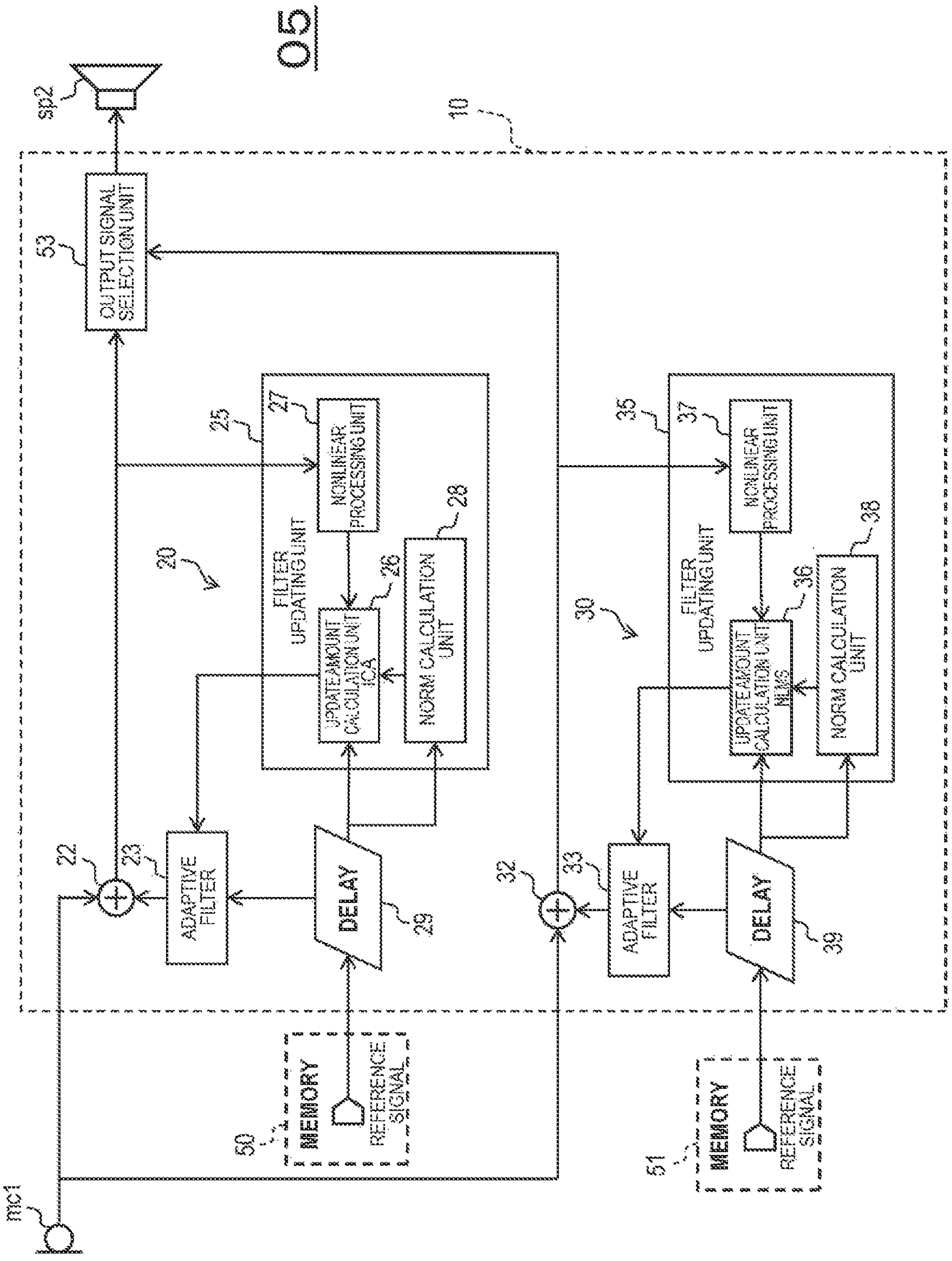
FIG. 3 is a block diagram showing a functional configuration of an acoustic noise suppressing apparatus according to the first embodiment.

FIG. 3 is a block diagram showing a functional configuration of the acoustic noise suppressing apparatus 05 according to the first embodiment.

The microphone mc1 and the speaker sp2 are connected to the acoustic noise suppressing apparatus 05, and the acoustic noise suppressing apparatus 05 mainly includes a digital signal processor (DSP) 10, a memory 50, and a memory 51. The microphone mcg and the speaker sp2 may be included in the acoustic noise suppressing apparatus 05. Similarly, the microphone mcg and the speaker sp1 may be included in the acoustic noise suppressing apparatus 05.

An outline of processing of the acoustic noise suppressing apparatus 05 is as follows. The acoustic noise suppressing apparatus 05 generates a signal in which the acoustic noise is suppressed by two processing systems each operating by using an algorithm having a different property, and determines a sound to be finally output by an output signal selection unit 53. In each processing system, a pseudo noise signal in which the acoustic noise is reproduced is generated by performing signal processing on the sound output from the speaker sp2 in the past. The acoustic noise in the sound picked up by the microphone mc1 in the first embodiment is the past sound output from the speaker sp2 and picked up by the microphone mc1. Therefore, the acoustic noise can be reproduced by using the past sound output from the speaker sp2. Then, the signal after the suppression of the acoustic noise is generated by removing the pseudo noise signal from the sound picked up by the microphone mc1.

Hereinafter, a functional configuration of the acoustic noise suppressing apparatus 05 will be described with reference to FIG. 3.

The memory 50 and the memory 51 store a signal of the sound output from the speaker sp2 in the past. The signal is used for reproduction of the acoustic noise in each system. Since the acoustic noise suppressing apparatus 05 performs the signal processing on the sound, a signal of the sound to be processed is hereinafter also referred to as an audio signal. Hereinafter, a reference signal stored in the memory 50 is referred to as a first reference signal, and a reference signal stored in the memory 51 is referred to as a second reference signal.

The DSP 10 is a processor that performs acoustic noise suppression by the two processing systems described above on the audio signal of the sound picked up by the microphone mc1, and performs processing of determining the audio signal after the suppression of the acoustic noise to be output. As shown in FIG. 3, the DSP 10 functionally includes a first suppression unit 20 and a second suppression unit 30 respectively corresponding to two processing systems, and includes an output signal selection unit 53 that determines a signal to be output to the speaker sp2.

The first suppression unit 20 includes an adder 22, an adaptive filter 23, a first filter updating unit 25, and a delay 29. The first suppression unit 20 suppresses the acoustic noise in the sound picked up by the microphone mc1 by subtracting the pseudo noise signal generated by the adaptive filter 23 from the audio signal of the sound picked up by the microphone mc1 by the adder 22. Then, the first acoustic noise suppression signal corresponding to the sound after the suppression of the acoustic noise is output to the output signal selection unit 53. As described above, although the processing performed by the adder 22 is a subtraction to be exact, the processing of subtracting the pseudo noise signal may be processing of adding an inverted pseudo noise signal, and can be realized by both the subtraction and the addition. Therefore, in the present specification, the processing is described as being performed by the adder 22.

Hereinafter, the processing of suppressing the acoustic noise by the first suppression unit 20 will be described in more detail based on the configuration of the first suppression unit 20.

The acoustic noise to be suppressed by the first suppression unit 20 is a sound output from the speaker sp2 in the past and reaching the microphone mc1. The sound reaches the microphone mc1 via the transmission paths pt1 to pt4 shown in FIG. 2. That is, the acoustic noise picked up by the microphone mc1 is a sound obtained by mixing the sound output from the speaker sp2 with a time lag required for the sound to pass through each transmission path. Therefore, the purpose is to generate the pseudo noise signal that reproduces the mixed sound by storing the sound output from the speaker sp2 in the past and performing signal processing on the sound.

The adaptive filter 23 is a filter that performs processing of generating the pseudo noise signal from the first reference signal, and specifically uses a finite impulse response (FIR) filter described in Patent Literature 1, JP-A-2007619595 or the like. By reproducing the transmission characteristic between the speaker sp2 and the microphone mc1 in the adaptive filter 23 and processing the first reference signal, the pseudo noise signal can be generated. However, since the transmission characteristic in the vehicle interior 8*z* is not constant, the characteristic of the adaptive filter 23 is changed as needed. Therefore, in the first embodiment, by controlling a coefficient or the number of taps of the FIR filter by the first filter updating unit 25, the characteristic of the adaptive filter 23 is changed so as to approach the latest transmission characteristic between the speaker sp2 and the microphone mc1. Hereinafter, updating of the adaptive filter may be referred to as learning.

Here, the sound output from the speaker sp2 as the reproduced sound and picked up by the microphone mc1 is delayed by a time required for transferring between the speaker sp2 and the microphone mc1. On the other hand, since the first reference signal is stored in the memory 50 immediately before being output from the speaker sp2, the delay between the speaker sp2 and the microphone mc1 is not reflected. Therefore, in the first embodiment, this time difference is absorbed by the delay 29, and the first reference signal matching the timing when the sound is picked up by the microphone mc1 is obtained. That is, by delaying the first reference signal by the delay 29 by a time obtained by dividing a distance between the speaker sp2 and the microphone mc1 by the sound velocity, the reproduced sound at the timing when the reproduced sound is actually picked up by the microphone mc1 is reproduced. The value of the delay 29 can be obtained by actually measuring the distance between the speaker sp2 and the microphone mc1 and dividing the distance by the sound velocity. For example, when a distance between the driver's seat and the rear seat in the vehicle interior is about 4 meters, the value of the delay 29 is about 10 msec.

Next, the first filter updating unit 25 will be described in detail. The first filter updating unit 25 includes an update amount calculation unit 26, a nonlinear processing unit 27, and a norm calculation unit 28.

The nonlinear processing unit 27 performs nonlinear conversion on the signal after the suppression of the acoustic noise to be output from the speaker sp2. The nonlinear transformation is processing of converting the signal after the suppression of the acoustic noise into information indicating a direction (positive or negative) in which the filter is to be updated. The nonlinear processing unit 27 outputs the nonlinear-converted signal to the update amount calculation unit 26.

The norm calculation unit 28 calculates a norm of the audio signal output from the speaker sp2 in the past. The norm of the speaker signal is a sum of the magnitudes of the speaker signals within a predetermined time in the past, and is a value indicating the degree of the magnitude of the signal within this time. The norm is used by the update amount calculation unit 26 to normalize the influence of the volume of the sound output from the speaker sp2 in the past. In general, since an update amount of the filter is also calculated to be larger as the volume is larger, the characteristic of the adaptive filter 23 are excessively affected by the characteristic of the loud sound unless normalization is performed. Therefore, in the first embodiment, the update amount of the adaptive filter 23 is stabilized by normalizing the audio signal output from the delay 29 using the norm calculated by the norm calculation unit 28.

The update amount calculation unit 26 calculates an update amount of a filter characteristic of the adaptive filter 23 (specifically, the update amount of the coefficient or the number of taps of the FIR filter) from the signal received from the nonlinear processing unit 27, the norm calculation unit 28, and the delay 29. Specifically, the sound output from the speaker sp2 in the past and received from the delay 29 is normalized based on the norm calculated by the norm calculation unit 28. Then, the update amount is determined by adding positive or negative information based on the information obtained from the nonlinear processing unit 27 to the result of normalizing the sound output from the speaker sp2 in the past. In the first embodiment, the update amount calculation unit 26 calculates the update amount of the filter characteristic by the independent component analysis (ICA) algorithm.

By executing the processing of the update amount calculation unit 26, the nonlinear processing unit 27, and the norm calculation unit 28 as needed, the first filter updating unit 25 can make the characteristic of the adaptive filter 23 approach the transmission characteristic between the speaker sp2 and the microphone mc1.

Next, the second suppression unit 30 will be described in detail. The second suppression unit 30 includes an adder 32, an adaptive filter 33, a second filter updating unit 35, and a delay 39. The second filter updating unit 35 includes an update amount calculation unit 36, a nonlinear processing unit 37, and a norm calculation unit 38. Since the principle of suppressing the acoustic noise by the second suppression unit 30 is similar to that by the first suppression unit, hereinafter, only the operation of each component will be described.

The second suppression unit 30 suppresses the acoustic noise in the sound picked up by the microphone mc1 by adding (subtracting) pseudo noise signal generated by the adaptive filter 33 to (from) the sound picked up by the microphone mc1 by the adder 32.

Hereinafter, the processing of suppressing the acoustic noise by the second suppression unit 30 will be described in more detail based on the configuration of the second suppression unit 30.

The adaptive filter 33 is a filter that performs processing of generating the pseudo noise signal from the second reference signal, and specifically uses an FIR filter. In the second suppression unit 30, by controlling a coefficient or the number of taps of the FIR filter by the second filter updating unit 35, the characteristic of the adaptive filter 33 is changed so as to approach the latest transmission characteristic between the speaker sp2 and the microphone mc1.

Next, the second filter updating unit 35 will be described in detail. The second filter updating unit 35 includes an update amount calculation unit 36, a nonlinear processing unit 37, and a norm calculation unit 38.

The nonlinear processing unit 37 performs nonlinear conversion on the signal after the suppression of the acoustic noise to be output from the speaker sp2. The nonlinear processing unit 37 outputs, to the update amount calculation unit 36, a signal indicating a direction in which the filter characteristic obtained by the nonlinear conversion is to be changed.

The norm calculation unit 38 calculates a norm of the sound output from the speaker sp2 in the past.

The update amount calculation unit 36 calculates an update amount of a filter characteristic of the adaptive filter 33 (specifically, the update amount of the coefficient or the number of taps of the FIR filter) from the signal received from the nonlinear processing unit 37, the norm calculation unit 38, and the delay 39. Specifically, the audio signal of the sound output from the speaker sp2 in the past and received from the delay 39 is normalized based on the norm calculated by the norm calculation unit 38. Then, the update amount is determined by adding the positive or negative information based on the information obtained from the nonlinear processing unit 27 to the result of normalizing the audio signal of the sound output from the speaker sp2 in the past. Here, unlike the update amount calculation unit 26, the update amount calculation unit 36 calculates the update amount of the filter characteristic by the normalized least mean square (NLMS) algorithm.

The output signal selection unit 53 selects an audio signal corresponding to the sound to be output from the speaker sp2 from the audio signal output from the processing system including the first suppression unit 20 and the audio signal output from the processing system including the second suppression unit. For example, the output signal selection unit 53 outputs an audio signal having a smaller sound pressure to the speaker sp2. This is because it is considered that the sound pressure is appropriately reduced when the acoustic noise is appropriately suppressed. Further, instead of the determination based on the sound pressure, it may be statistically determined whether the acoustic noise is suppressed. The accuracy of the determination can be improved by performing selection statistically.

As described above, the algorithms used for updating the adaptive filter 23 and the adaptive filter 33 are different between the first suppression unit 20 and the second suppression unit 30. The ICA used by the first suppression unit 20 is an algorithm which is effective when a plurality of persons are talking in the vehicle interior 8*z*. The NLMS used by the second suppression unit 30 is an algorithm which is effective when one person is talking. Therefore, it is possible to output an appropriate sound in accordance with a change in the environment by outputting an audio signal in which acoustic noise is further suppressed among the audio signals in which the acoustic noise is suppressed by using algorithms having different properties.

[Acoustic Noise Suppressing operation]

Figure 4:
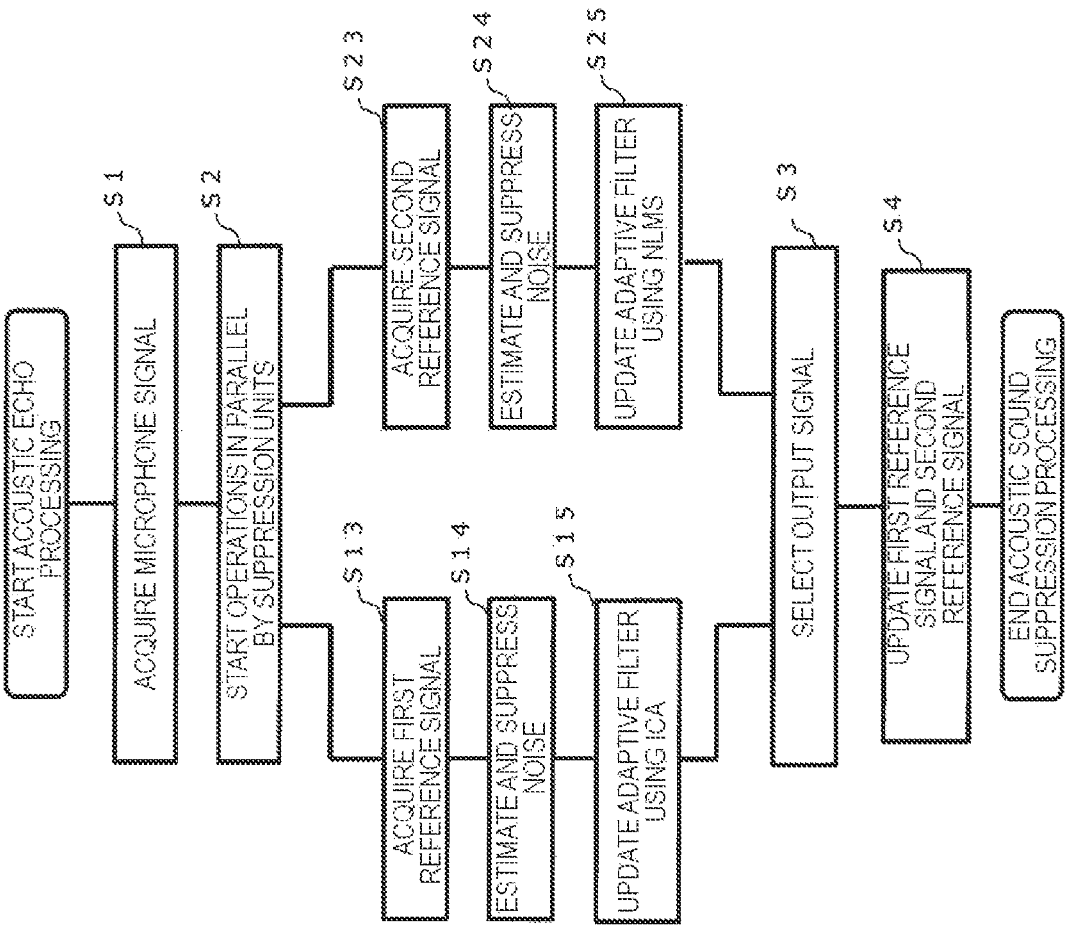
FIG. 4 is a flow chart showing an operation of the acoustic noise suppressing apparatus according to the first embodiment.

FIG. 4 is a flowchart showing in detail the procedure of an acoustic noise suppressing operation of the acoustic noise suppressing apparatus 05 according to the first embodiment. Each processing shown in FIG. 4 is repeatedly executed by the DSP 10 when power is supplied to the acoustic noise suppressing apparatus by, for example, switching on an ignition key switch mounted in the vehicle 8.

The DSP 10 acquires an audio signal of a sound picked up by the microphone mc1 (S1).

The DSP 10 instructs each of the first suppression unit 20 and the second suppression unit 30 to execute processing in parallel in terms of time. Accordingly, the first suppression unit 20 and the second suppression unit 30 process steps S13 to S15 and steps S23 to S25 in parallel in terms of time (S2).

The first suppression unit 20 acquires a first reference signal from the memory 50 (S13).

The first suppression unit 20 generates a pseudo noise signal by the adaptive filter 23 using the first reference signal delayed by the delay 29 by a predetermined time corresponding to the distance between the speaker sp2 and the microphone mc1. Then, the pseudo noise signal is added or subtracted to or from the audio signal of the sound picked up by the microphone mc1 by the adder 22. Accordingly, the first suppression unit 20 generates a signal after the suppression of the acoustic noise by subtracting the pseudo noise signal from the audio signal of the sound picked up by the microphone mc1. Since the generated signal after the suppression of the acoustic noise is used for next update processing of the filter coefficient, the signal is output to the first filter updating unit 25 regardless of whether the signal is finally output from the speaker sp2 (S14).

The first filter updating unit 25 calculates an update amount of a filter characteristic and updates the characteristic of the adaptive filter 23 according to the procedure described above. Here, the first filter updating unit 25 calculates the update amount of the filter characteristic by the ICA (S15).

On the other hand, the second suppression unit 30 acquires a second reference signal stored in the memory 51 (S23).

The second suppression unit 30 generates a pseudo noise signal by the adaptive filter 33 using the second reference signal delayed by the delay 39 by the predetermined time corresponding to the distance between the speaker sp2 and the microphone mc1. Then, the pseudo noise signal is added or subtracted to or from the audio signal picked up by the microphone mc1 by the adder 32. Accordingly, the second suppression unit 30 generates a signal after the suppression of the acoustic noise by subtracting the pseudo noise signal from the audio signal picked up by the microphone mc1. Since the generated signal after the suppression of the acoustic noise is used for next update processing of the filter coefficient, the signal is output to the second filter updating unit 35 regardless of whether the signal is finally output from the speaker sp2 (S24).

The second filter updating unit 35 calculates an update amount of a filter characteristic and updates the characteristic of the adaptive filter 33 according to the procedure described above. Here, the second filter updating unit 35 calculates the update amount of the filter characteristic by the NLMS (S25).

The output signal selection unit 53 selects an audio signal to be output from the audio signal after suppression of the acoustic noise output from the first suppression unit 20 and the audio signal after suppression of the acoustic noise output from the second suppression unit 30. For example, the output signal selection unit 53 compares the sound pressures of the respective audio signals, and selects an audio signal having a smaller sound pressure as the audio signal to be output to the speaker sp2 (S3).

Further, the signal selected as the signal to be output to the speakers are stored as the first reference signal and the second reference signal in the memory 50 and the memory 51, respectively (S4).

As described above, the DSP 10 repeatedly executes the series of processing.

[Update Example of Adaptive Filter]

FIGS. 5A to 5E are graphs showing an example of a growth process of the adaptive filter 23 at the time of initial activation.

Figure 5A:
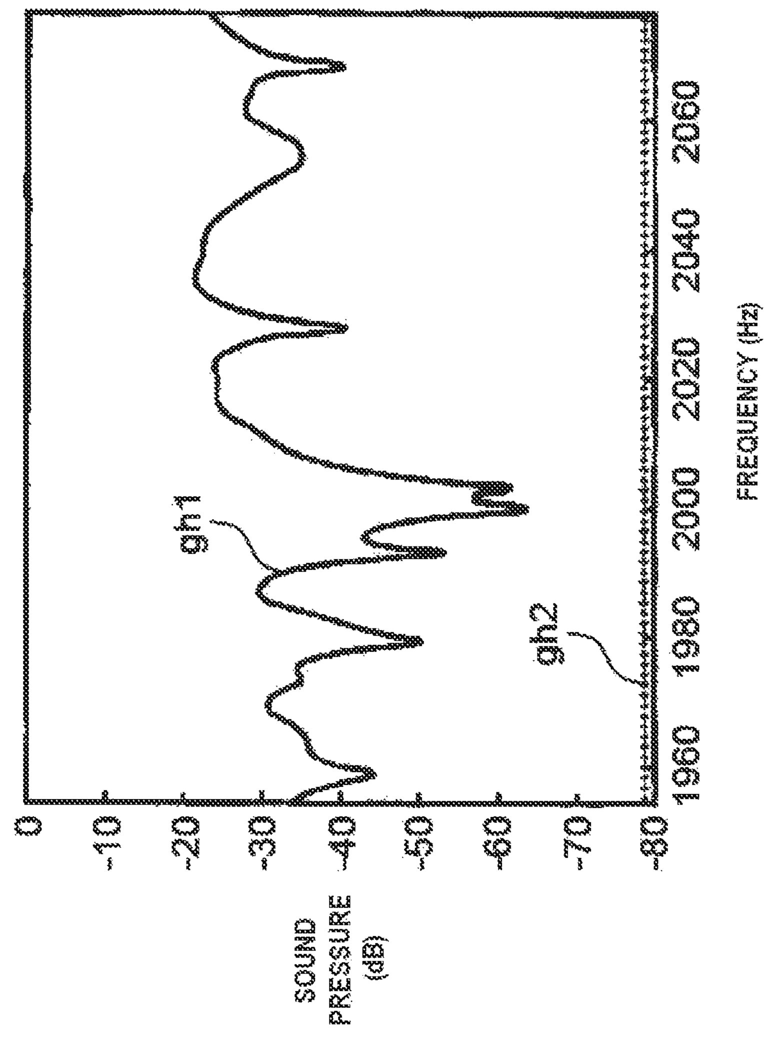
FIG. 5A is a graph showing an example of a growth process of an adaptive filter at the time of first activation.

A vertical axis of each graph represents sound pressure and a horizontal axis represents frequency. In an initial state at the time of the first activation, as shown in FIG. 5A, the adaptive filter 23 does not generate a pseudo noise signal gh2 for an acoustic noise signal gh1 picked up by the microphone mc1.

Figure 5B:
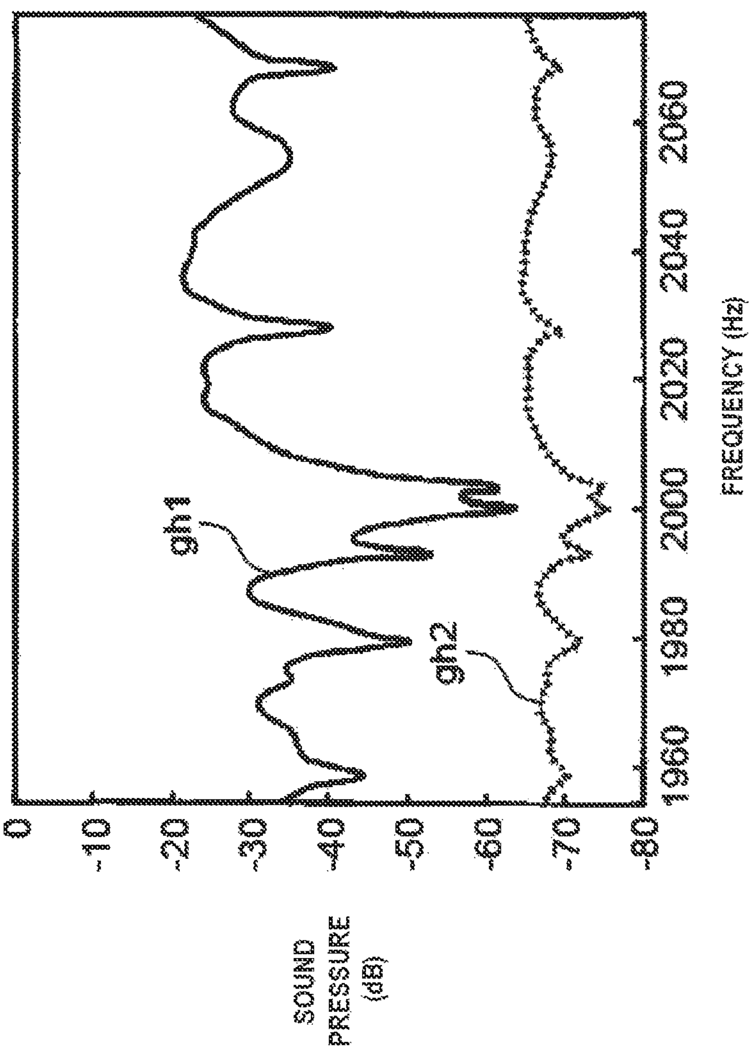
FIG. 5B is a graph showing an example of the growth process of the adaptive filter at the time of the first activation.
Figure 5C:
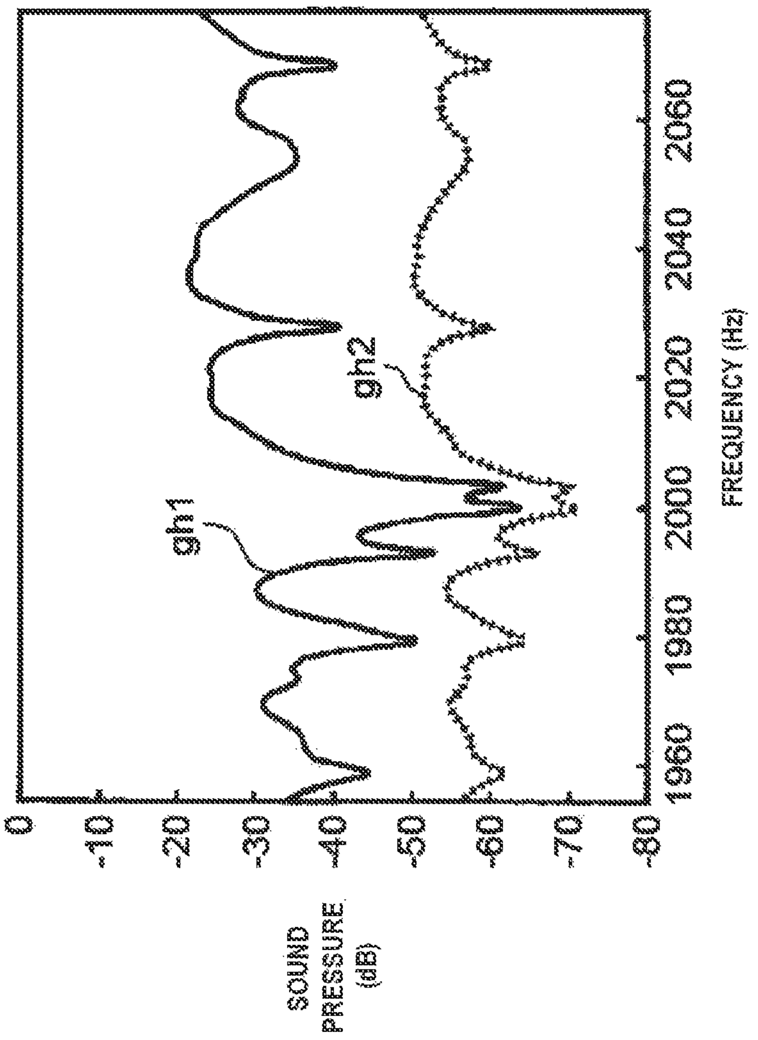
FIG. 5C is a graph showing an example of the growth process of the adaptive filter at the time of the first activation.
Figure 5D:
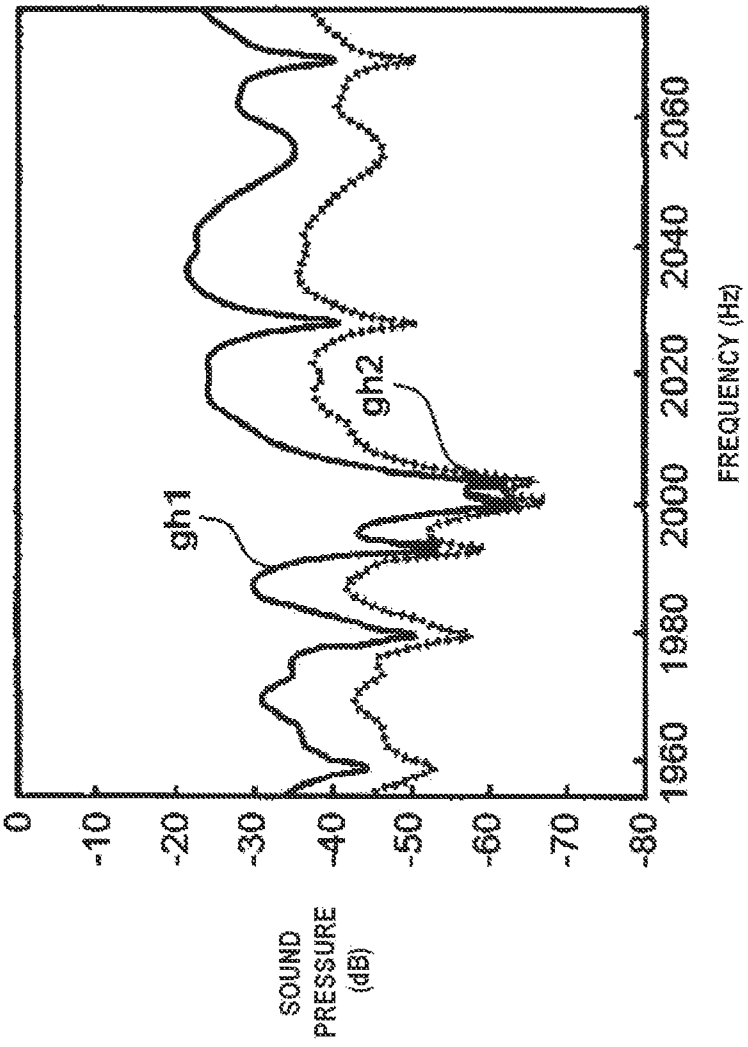
FIG. 5D is a graph showing an example of the growth process of the adaptive filter at the time of the first activation.
Figure 5E:
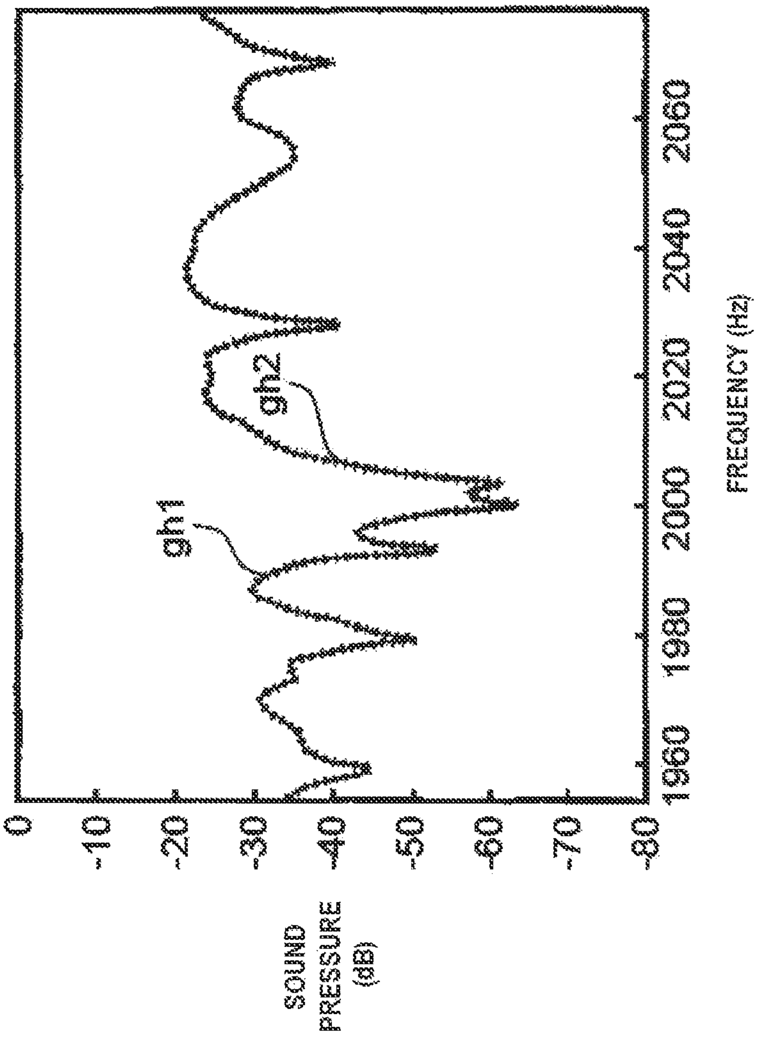
FIG. 5E is a graph showing an example of the growth process of the adaptive filter at the time of the first activation.

Thereafter, as shown in FIGS. 5B to 5D, the adaptive filter 23 grows (in other words, the filter coefficient of the adaptive filter 23 performs learning) as time passes, and the pseudo noise signal gh2 generated by the adaptive filter 23 approaches the acoustic noise signal gh1 picked up by the microphone mc1. In a stable state, as shown in FIG. 5E, the pseudo noise signal gh2 generated by the adaptive filter 23 substantially match the acoustic noise signal gh1 picked up by the microphone mc1.

Although FIGS. 5A to 5E show an example of the growth process of the adaptive filter 23, similarly to the adaptive filter 23, the pseudo noise signal generated by the adaptive filter 33 also grows so as to substantially match the acoustic noise signal gh1, although the adaptive filter 23 and the adaptive filter 33 differ in the rate of change and a degree of matching the final acoustic noise signal gh1.

FIGS. 6A to 6E are graphs showing an example of a change process of the adaptive filter 23 when the environment changes.

Figure 6A:
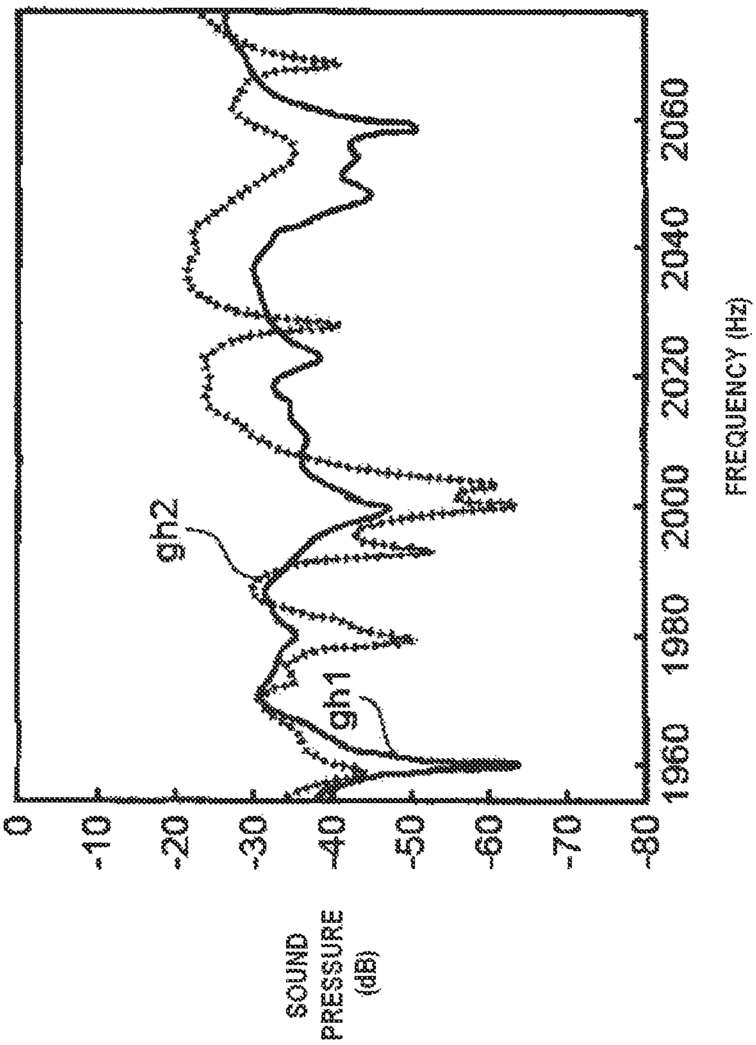
FIG. 6A is a graph showing an example of a change process of the adaptive filter when an environment changes.

When a situation in the vehicle interior 8z changes (for example, opening and closing of a window of the vehicle) and the sound field suddenly changes, that is, when the sound field changes suddenly, the pseudo noise signal gh2 generated by the adaptive filter 23 largely deviates from the acoustic noise signal gh1 picked up by the microphone erect. In FIG. 6A, there are many frequency bands in which the sound pressure of the pseudo noise signal gh2 exceeds the sound pressure of the acoustic noise signal gh1.

Figure 6B:
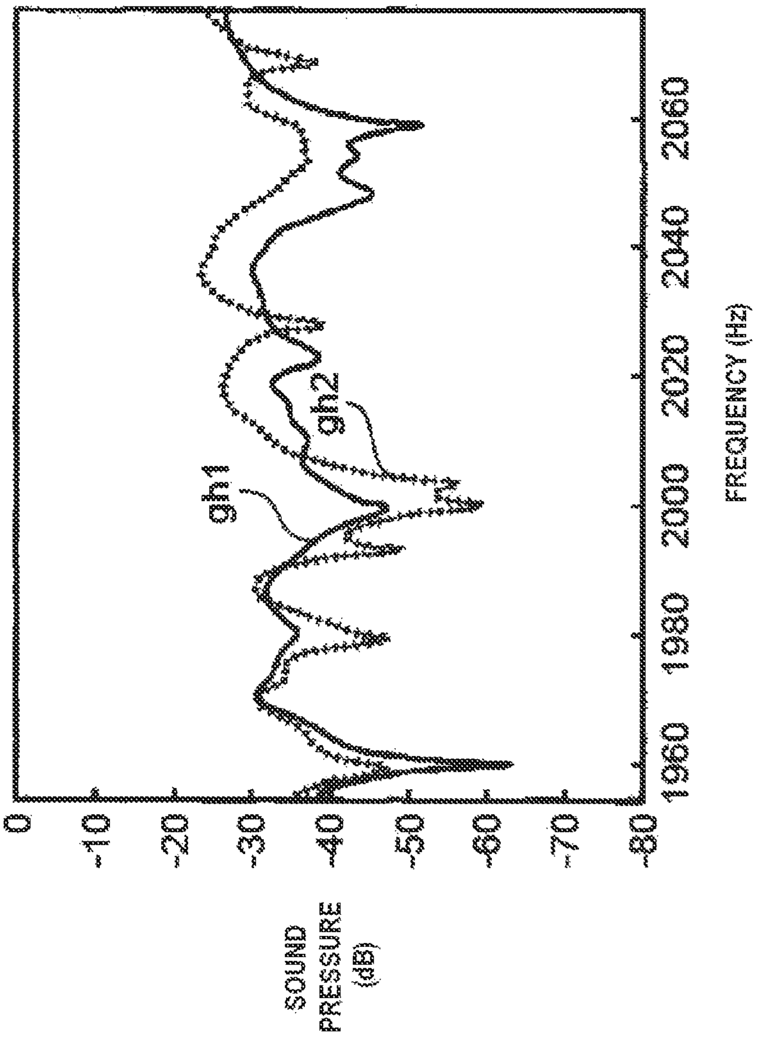
FIG. 6B is a graph showing an example of the change process of the adaptive filter when the environment changes.
Figure 6C:
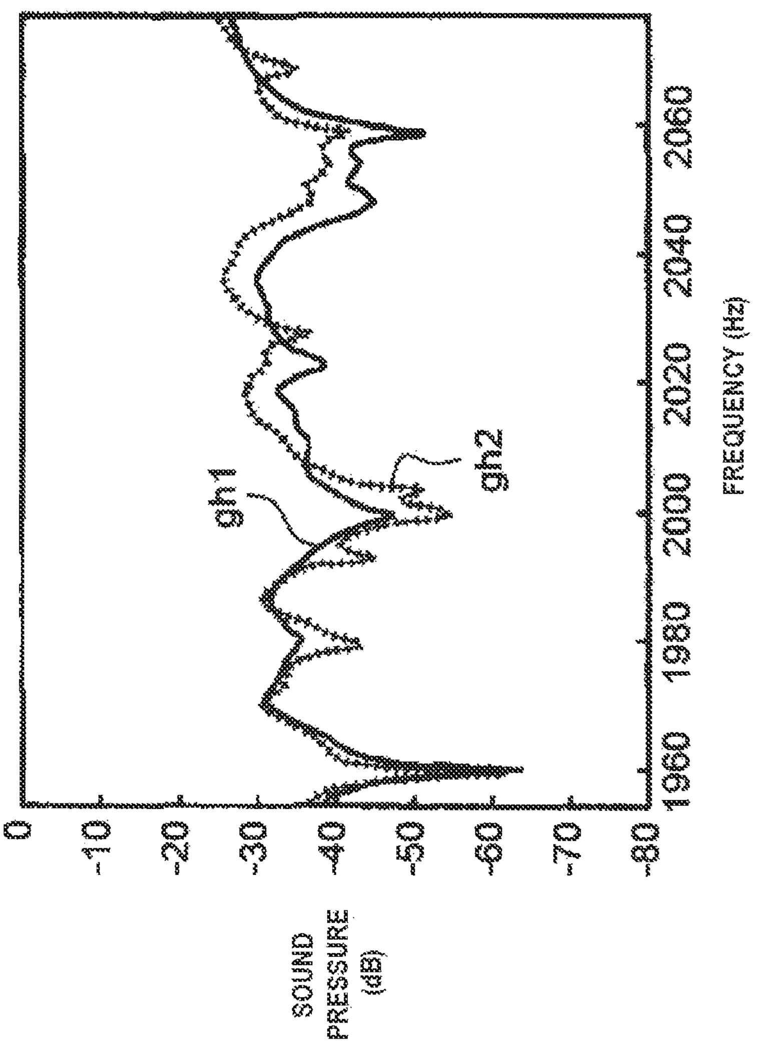
FIG. 6C is a graph showing an example of the change process of the adaptive filter when the environment changes.
Figure 6D:
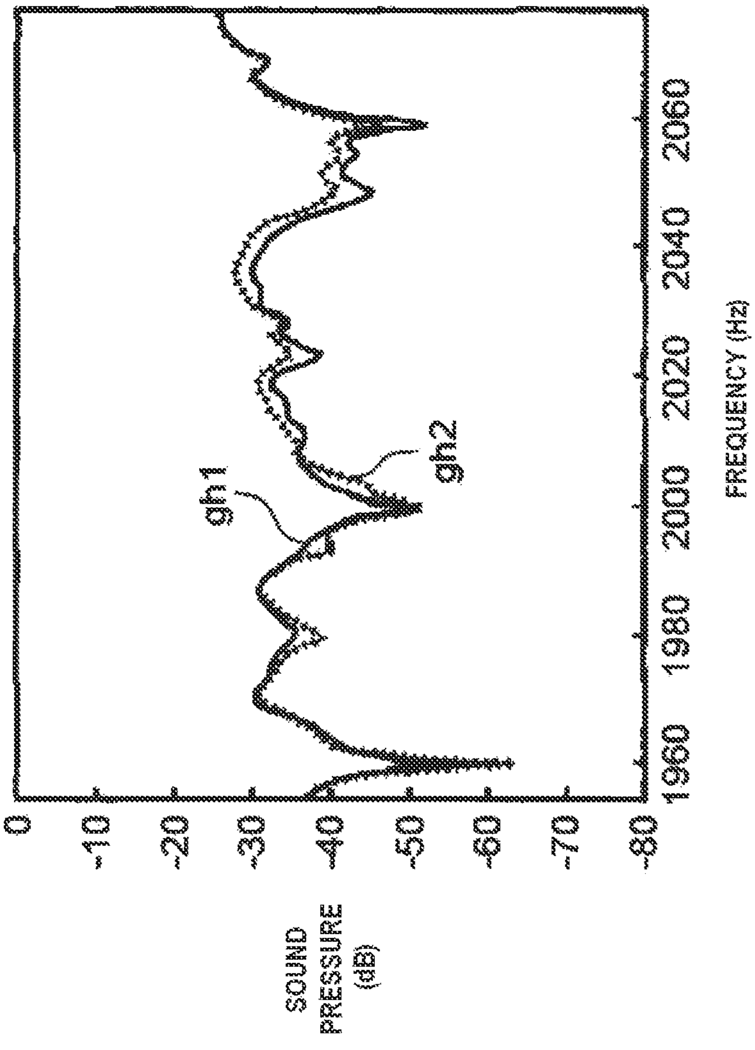
FIG. 6D is a graph showing an example of the change process of the adaptive filter when the environment, changes.
Figure 6E:
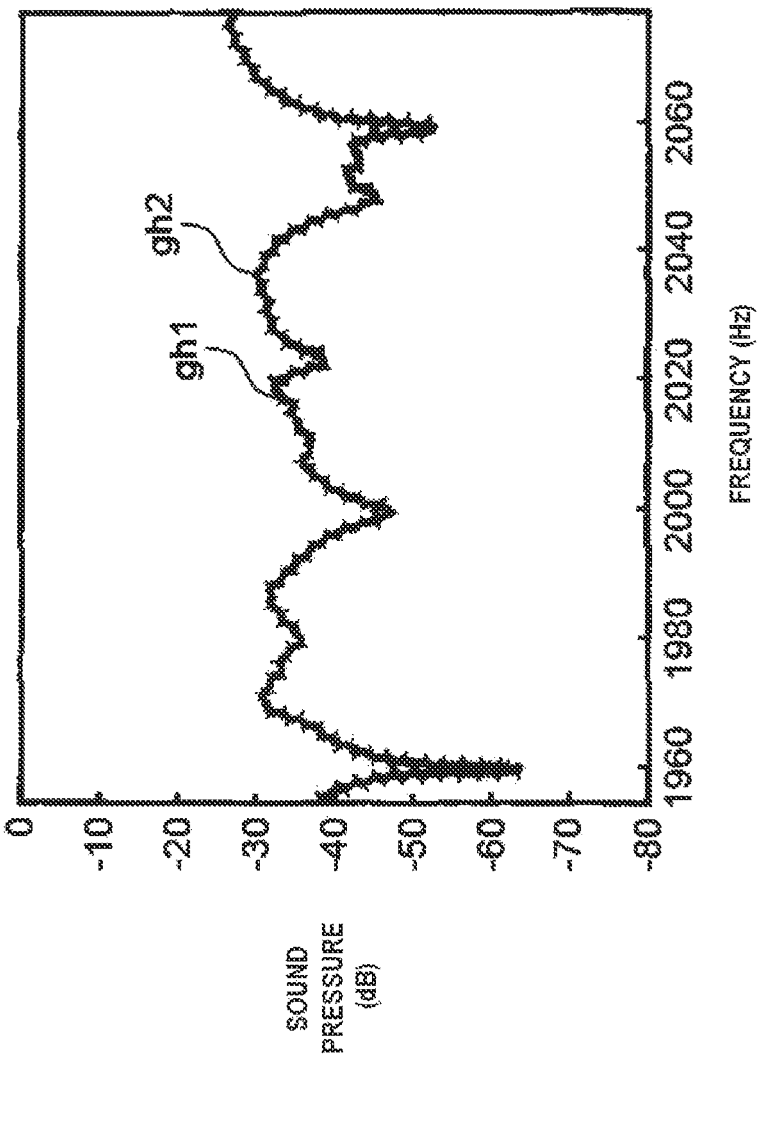
FIG. 6E is a graph showing an example of the change process of the adaptive filter when the environment changes.

Thereafter, as shown in FIGS. 6B to 6D, the adaptive filter 23 grows (in other words, the filter coefficient or the number of tags of the adaptive filter 23 is learned) as time passes, and the pseudo noise signal gh2 generated by the adaptive filter 23 approaches the acoustic noise signal gh1 picked up by the microphone mc1. In a stable state after a certain period of time passes from the start of environmental change, as shown in FIG. 6E, the pseudo noise signal gh2 generated by the adaptive filter 23 substantially match the acoustic noise signal gh1 picked up by the microphone mc1.

Although FIGS. 6A to 6E show an example of the growth process of the adaptive filter 23, similarly to the adaptive filter 23, the pseudo noise signal generated by the adaptive filter 33 also grows so as to substantially match the acoustic noise signal gh1, although the adaptive filter 23 and the adaptive filter 33 differ in the rate of change and a degree of matching the final acoustic noise signal gh1.

Summary of First Embodiment

As described above, in the acoustic noise suppressing apparatus of the first embodiment, the microphone mc1 picks up the sound of the driver hm1 (person) in the vehicle interior 8z. The adder 22 outputs the first suppressed audio signal in which the acoustic noise included in the audio signal is suppressed based on the audio signal of the driver hm1 picked up by the microphone mc1 and the speaker signal (first reference signal) stored in the memory 50. The adder 32 outputs the second suppressed audio signal in which the acoustic noise included in the audio signal is suppressed based on the audio signal of the driver hm1 picked up by the microphone mc1 and the speaker signal (second reference signal) stored in the memory 51. The output signal selecting unit 53 compares the sound pressures of the first suppressed audio signal and the second suppressed audio signal, and selects the audio signal having a smaller sound pressure and outputs the selected audio signal from the speaker sp2.

Here, the acoustic noise suppressing apparatus 05 is configured to use different algorithms for the first filter updating unit 25 and the second filter updating unit 35. Therefore, the adaptive filter 23 and the adaptive filter 33 can be filters having different characteristics. Therefore, even if the environment is not suitable for suppressing the acoustic noise by one of the adaptive filters, the acoustic noise can be suppressed by the other adaptive filter, so that deterioration of sound quality can be suppressed.

The first embodiment describes a configuration in which the in-vehicle conversation support system 3 suppresses the acoustic noise generated by the speaker sp2 and included in the sounds that are picked up by the microphone mc1 for the driver hm1. However, the configuration described in the above embodiment can also be applied to a configuration that suppresses the acoustic noise generated by the speaker sp2 and included in the sound that is picked up by the microphone mcg for the occupant hm2.

In the first embodiment, the in-vehicle conversation support system 3 is assumed to support a conversation between the driver hm1 and the occupant hm2 seated on the rear seat. However, a combination of occupants in the conversation is arbitrary. For example, in a vehicle having three rows of seats in a front-rear direction, a similar configuration is applied to a conversation between an occupant seated on a passenger seat and an occupant seated on a center seat.

That is, the acoustic noise suppressing apparatus 05 according to the first embodiment may be configured to suppress the sound generated by the reproduced sound that is output from any speaker installed in the environment so as to improve the sound quality. The acoustic noise suppressing apparatus 05 has a function of suppressing the acoustic noise which corresponds to the number of combinations of microphones and speakers. A description of the configuration and processing procedure in each combination will be omitted because only a combination of the speaker and the microphone to be used in the configuration of the above-described embodiment changes.

Second Embodiment

In the first embodiment, an example is shown in which the sound output from the speaker is suppressed as the acoustic noise. On the other hand, in the second embodiment, an example is shown in which a sound uttered by a person other than the person assumed to be a sound pick-up target of a microphone (for example, a sound uttered by the occupant hm2 in the first embodiment) is suppressed as acoustic noise.

[Transmission Environment of Sound]

Figure 7:
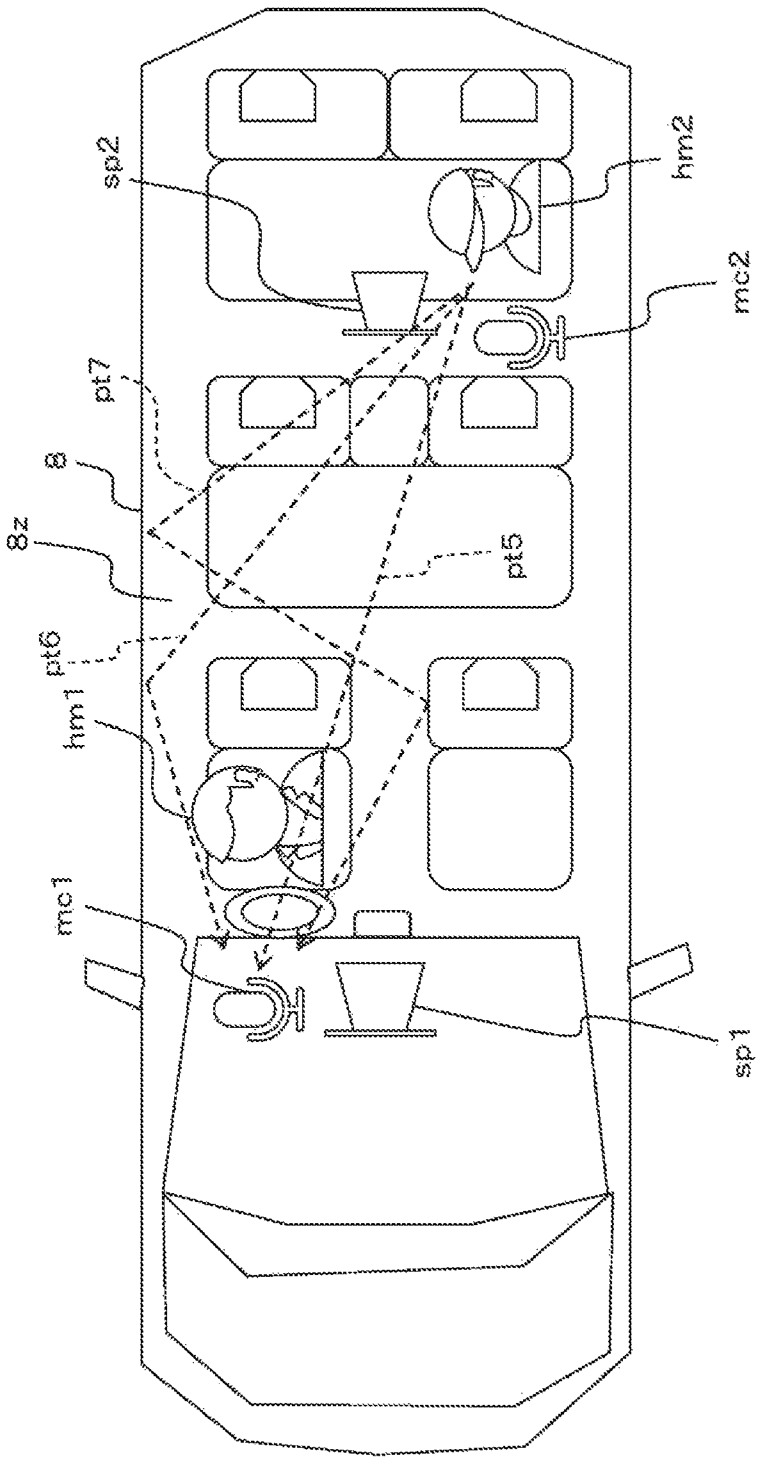
FIG. 7 is a diagram showing an example of transmission paths of direct waves and indirect waves in a vehicle interior according to a second embodiment.

A transmission environment of a sound assumed in the second embodiment will be described with reference to FIG. 7. In order to simplify the description, similarly to the first embodiment, only a part of the transmission paths is shown as an example.

The sound uttered by the driver hm1 is picked up by the microphone mc1. At the same time as the sound picked up by the microphone mc1, a sound uttered by the occupant hm2 on the rear seat is picked up as acoustic noise by the microphone mc1 directly or indirectly via transmission paths pt5 to pt7 in the vehicle interior 8*z*.

The transmission path pt5 is a transmission path of a direct wave in which the sound uttered by the occupant hm2 reaches the microphone mc1 directly. The transmission path pt6 is a transmission path of an indirect wave in which the sound uttered by the occupant hm2 is reflected by the door on the driver seat side and reaches the microphone mc1. The transmission path pt7 is a transmission path of an indirect wave in which the sound uttered by the occupant hm2 is reflected by the door on the rear seat side and the side box of the driver's seat and reaches the microphone mc1 The transmission paths shown in FIG. 7 are examples, and the sound uttered by the occupant mc2 is picked up by the microphone mc1 through various transmission paths. For the sake of simplicity, the following description will be made assuming that the transmission paths between the occupant hm2 and the microphone mc1 are pt5 to pt7, but it goes without saying that there are various transmission paths in reality. Further, an integration of these transmission paths (pt5 to pt7 and various transmission paths not shown) is the transmission characteristic in the vehicle interior 8*z* in the second embodiment. The transmission characteristic may be changed in a similar manner as in the first embodiment.

In the second embodiment, the sounds picked up by the microphone mc1 include not only the sound uttered by the driver hm1 but also the sound of the occupant hm2 reaching the microphone mc1 via the transmission paths pt5 to pt7. When the sounds picked up by the microphone mc1 are output from the speaker sp2 directly, the reproduced sound output from the speaker sp2 includes acoustic noise (reproduced sound of the occupant hm2). An acoustic noise suppressing apparatus 05A improves sound quality by suppressing the acoustic noise generated in such a situation.

[Configuration of Acoustic Noise Suppressing Apparatus]

Figure 8:
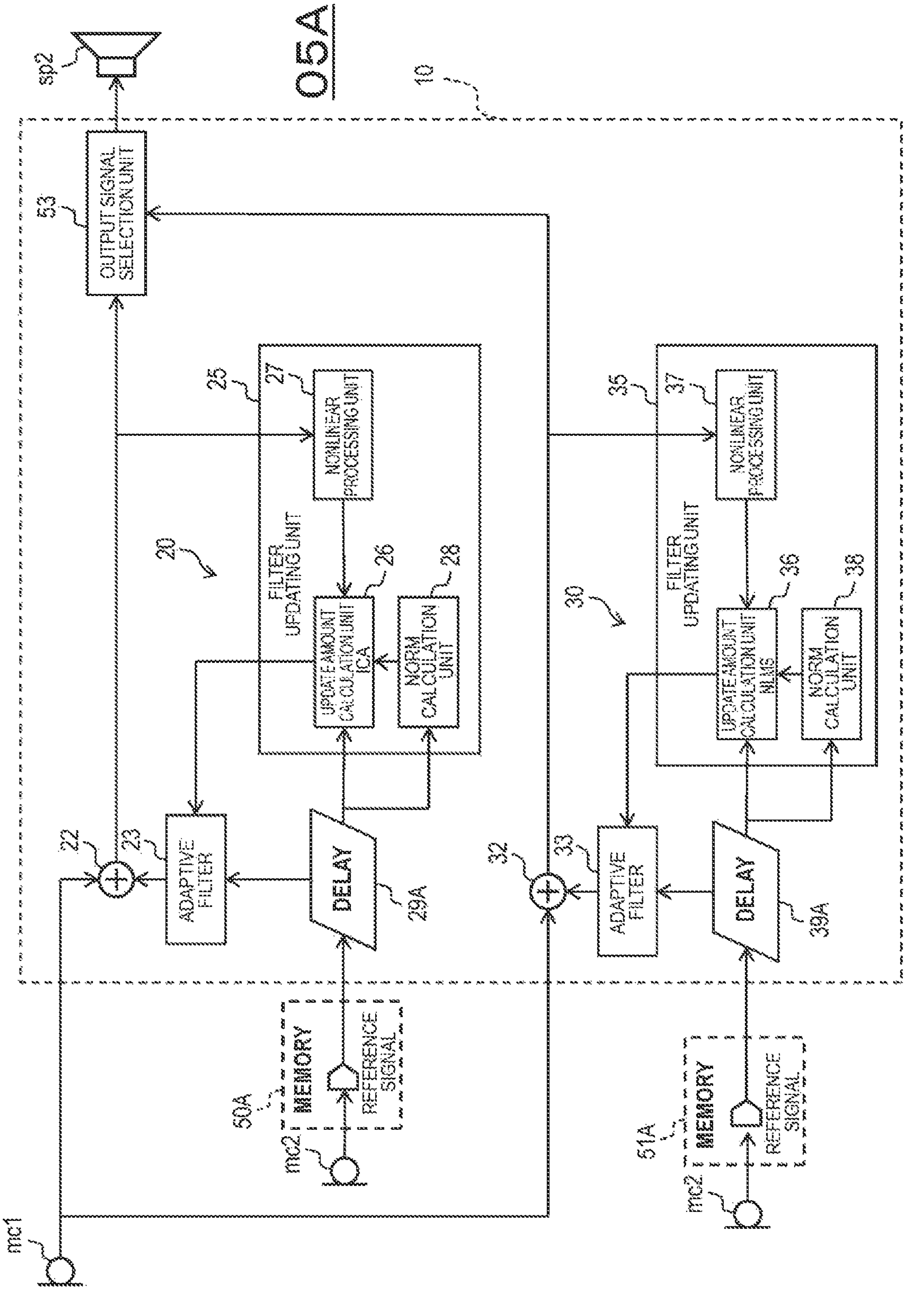
FIG. 8 is a block diagram showing a functional configuration of an acoustic noise suppressing apparatus according to the second embodiment.

FIG. 8 is a block diagram showing a functional configuration of the acoustic noise suppressing apparatus 05A according to the second embodiment. The same components as those in the first embodiment are denoted by the same reference numerals as in FIG. 3, and a description thereof will be omitted.

Since the basic configuration of the acoustic noise suppressing apparatus 05A and the principle of acoustic noise suppression are similar to those of the acoustic noise suppressing apparatus 05 in the first embodiment, hereinafter, differences from the acoustic noise suppressing apparatus 05 will be mainly described.

Although the first embodiment reproduces the acoustic noise based on the sound output from the speaker sp2, the acoustic noise is reproduced based on the sound uttered by the occupant hm2 in the second embodiment.

Although the audio signal of the sound output from the speaker sp2 is stored in the memory 50 and the memory 51 in the first embodiment, since the audio signal of the sound output from the speaker sp2 is not treated as acoustic noise in the second embodiment, this processing is not performed. Instead, in the second embodiment, a memory 50A and a memory 51A store the audio signal of the sound uttered by the occupant hm2 as a first reference signal and a second reference signal, respectively. Here, the microphone mc1 is used to acquire the audio signal of the sound uttered by the occupant hm2.

Further, in the first embodiment in which the sound output from the speaker sp2 is treated as the acoustic noise, a delay obtained by dividing the distance between the speaker sp2 and the microphone mc1 by the speed of sound is generated as the delay 29 and the delay 39. Meanwhile, in the second embodiment in which the sound uttered by the occupant hm2 is treated as the acoustic noise, a delay obtained by dividing the distance between the occupant hm2 and the microphone mc1 by the speed of sound is used as a delay 29A and a delay 39A. Here, the distance between the occupant hint and the microphone mc1 is obtained by, for example, actually measuring the distance between the seat on which the occupant hm2 is assumed to be seated and the microphone mc1.

Strictly speaking, although the distance and the delay can be calculated more accurately when a distance between the occupant hm2 and the microphone mc2 is also included in measured values, in the second embodiment, the distance calculation is omitted since it is assumed that the microphone mc2 is in front of the eyes of the occupant hm2.

Since other configurations are similar to those of the first embodiment, a description thereof will be omitted.

[Acoustic Noise Suppressing operation]

Figure 9:
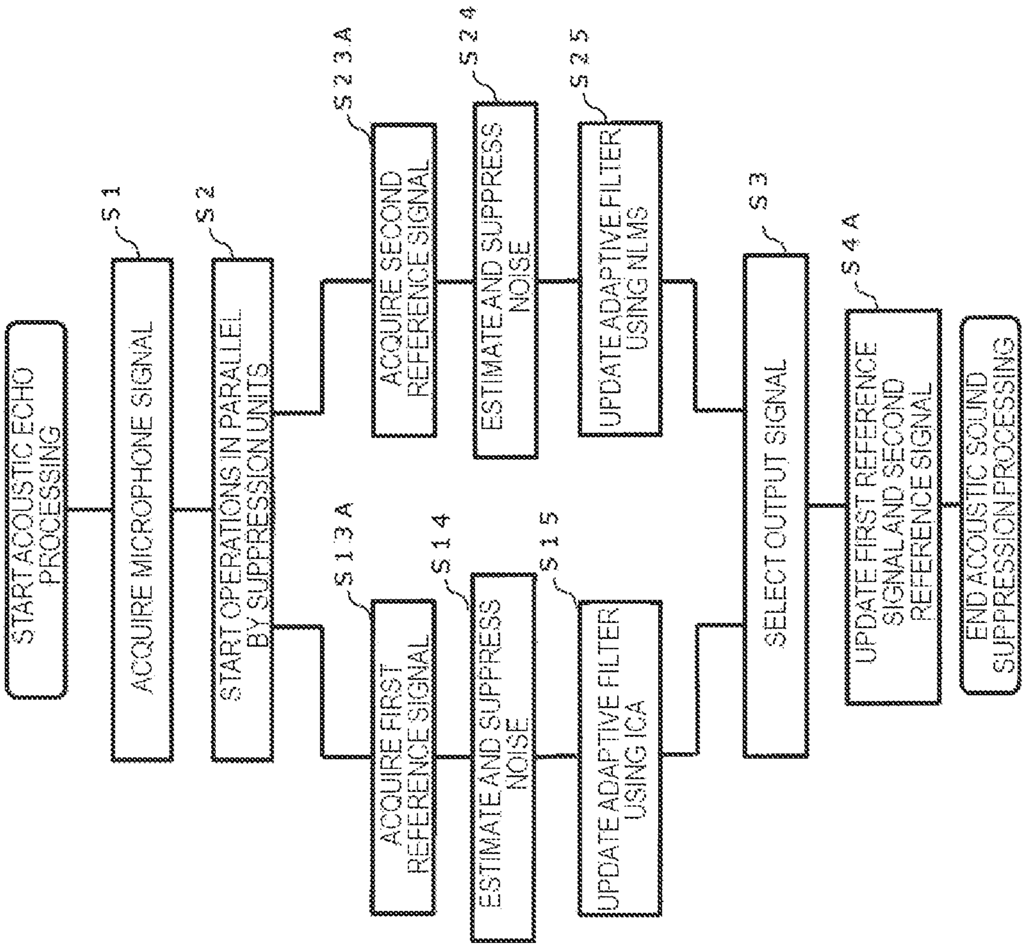
FIG. 9 is a flow chart showing an operation of the acoustic noise suppressing apparatus according to the second embodiment.

FIG. 9 is a flow chart showing an operation of the acoustic noise suppressing apparatus 05A according to the second embodiment. The same processing as that in the first embodiment is denoted by the same reference numeral as in FIG. 4, and a description thereof will be omitted.

The acoustic noise suppressing operation according to the second embodiment is similar to the acoustic noise suppressing operation in the first embodiment, except that a signal for generating the pseudo noise is the sound of the occupant hm2 picked up by the microphone mc1. Therefore, the processing is similar to that of the first embodiment except for the processing related to the sound of the occupant hm2 acquired from or stored in the memory 50A and the memory 51A. Hereinafter, only differences from the first embodiment will be described.

In the second embodiment, the audio signal picked up by the microphone mc2 and stored in the memory 50A and the memory 51A is acquired as the first reference signal and the second reference signal (S13A, S23A).

Further, the audio signal picked up by the microphone mc2 is stored as the first reference signal and the second reference signal, respectively, in the memory 50A and the memory 51A (S4A).

The sound of the occupant hm2 stored in the memory 50A and the memory 51A is updated after the selection of the output signal in accordance with the processing of the first embodiment. However, since the sound of the occupant hm2 is independent of the sound output from the speaker sp2, the sound may be updated at another timing.

Summary of Second Embodiment

As described above, in the acoustic noise suppressing apparatus 05A of the second embodiment, the microphone mc1 picks up the sound of the driver hm1 (person) in the vehicle interior 8*z*. The adder 22 outputs a first suppressed audio signal (first suppressed audio signal) in which the acoustic noise included in the audio signal is suppressed based on the audio signal of the driver hm1 picked up by the microphone mc1 and the sound of the occupant hm2 (first reference signal) picked up by the microphone mc2 and stored in the memory 50A. The adder 32 outputs a second suppressed audio signal (second suppressed audio signal) in which the acoustic noise included in the audio signal is suppressed based on the audio signal of the driver hint picked up by the microphone mc1 and the sound of the occupant hm2 (second reference signal) picked up by the microphone mc2 and stored in the memory 51A. The output signal selecting unit 53 compares the sound pressures of the first suppressed audio signal and the second suppressed audio signal, and selects the audio signal having a smaller sound pressure and outputs the selected audio signal from the speaker sp2.

Here, since the acoustic noise suppressing apparatus 05A uses different algorithms for the first filter updating unit 25 and the second filter updating unit 35, the adaptive filter 23 and the adaptive filter 33 can be filters having different characteristics. Therefore, even if the environment is not suitable for suppressing the acoustic noise by one of the adaptive filters, the acoustic noise can be suppressed by the other adaptive filter, so that deterioration of sound quality can be suppressed.

The second embodiment describes a configuration in which the in-vehicle conversation support system 3 suppresses the acoustic noise generated by the utterance of the occupant hm2 and included in the sounds that are picked up by the microphone mc1 for the driver hm1. However, the configuration described in the above embodiment can also be applied to a configuration that suppresses the acoustic noise generated by the utterance of the driver hm1 and included in the sound that is picked up by the microphone mc2 for the occupant hm2.

In the second embodiment, the in-vehicle conversation support system 3 is assumed to support a conversation between the driver hm1 and the occupant hm2 seated on the rear seat. However, a combination of occupants in the conversation is arbitrary. For example, in a vehicle having three rows of seats in the front-rear direction, a similar configuration is applied to a conversation between an occupant seated on a passenger seat and an occupant seated on a center seat.

That is, the acoustic noise suppressing apparatus 05A of the second embodiment may be configured to suppress the acoustic noise generated by the sound uttered by any occupant (including a driver) existing in the environment to improve sound quality. In this case, the acoustic noise suppressing apparatus 05A has a function of suppressing the acoustic noise which corresponds to the number of combinations of microphones and occupants. A description of the configuration and processing procedure in each combination will be omitted since only a combination of the target occupant and the microphone to be used in the configuration of the above-described embodiment changes.

Third Embodiment

In a third embodiment, an example is shown in which it is determined whether the adaptive filter should be updated based on information which identifies the number of talkers who talk simultaneously. Except for using number-of-talkers information for updating the adaptive filter, a description is omitted because the other configurations are similar to those of the other embodiments.

[Configuration of Acoustic Noise Suppression]

Figure 10:
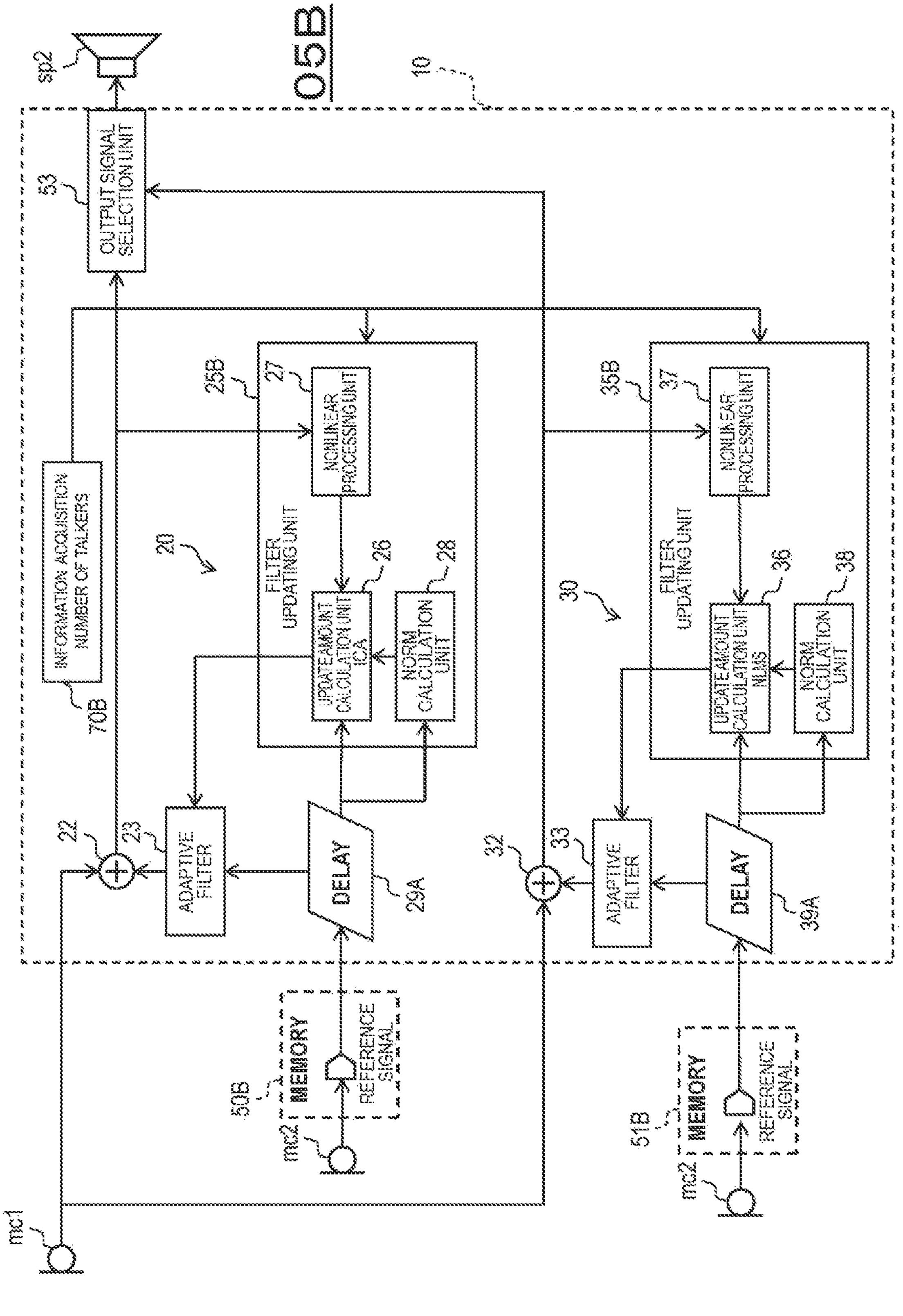
FIG. 10 is a block diagram showing a functional configuration of an acoustic noise suppressing apparatus according to a third embodiment.

FIG. 10 is a diagram showing a configuration of an acoustic noise suppressing apparatus 05B according to the third embodiment. Hereinafter, only differences from the second embodiment will be described.

An information acquisition unit 70B acquires the number-of-talkers information. Here, the number-of-talkers information is information for identifying the number of talkers who talk simultaneously. This information is estimated and generated based on a sound picked up by the microphone or an imaging result of a camera or the like. Specifically, the number of talkers can be estimated by counting the number of microphones whose volume exceeds a predetermined threshold in a plurality of microphones. When a camera is used, the number of talkers can be estimated by counting the number of occupants whose parts corresponding to mouths are moving.

A first filter updating unit 25B and a second filter updating unit 35B switch whether to update respective adaptive filters according to the number of talkers. Since the procedure for updating the adaptive filters is the same as that in the second embodiment, a description thereof will be omitted.

[Acoustic Noise Suppressing operation]

Figure 11:
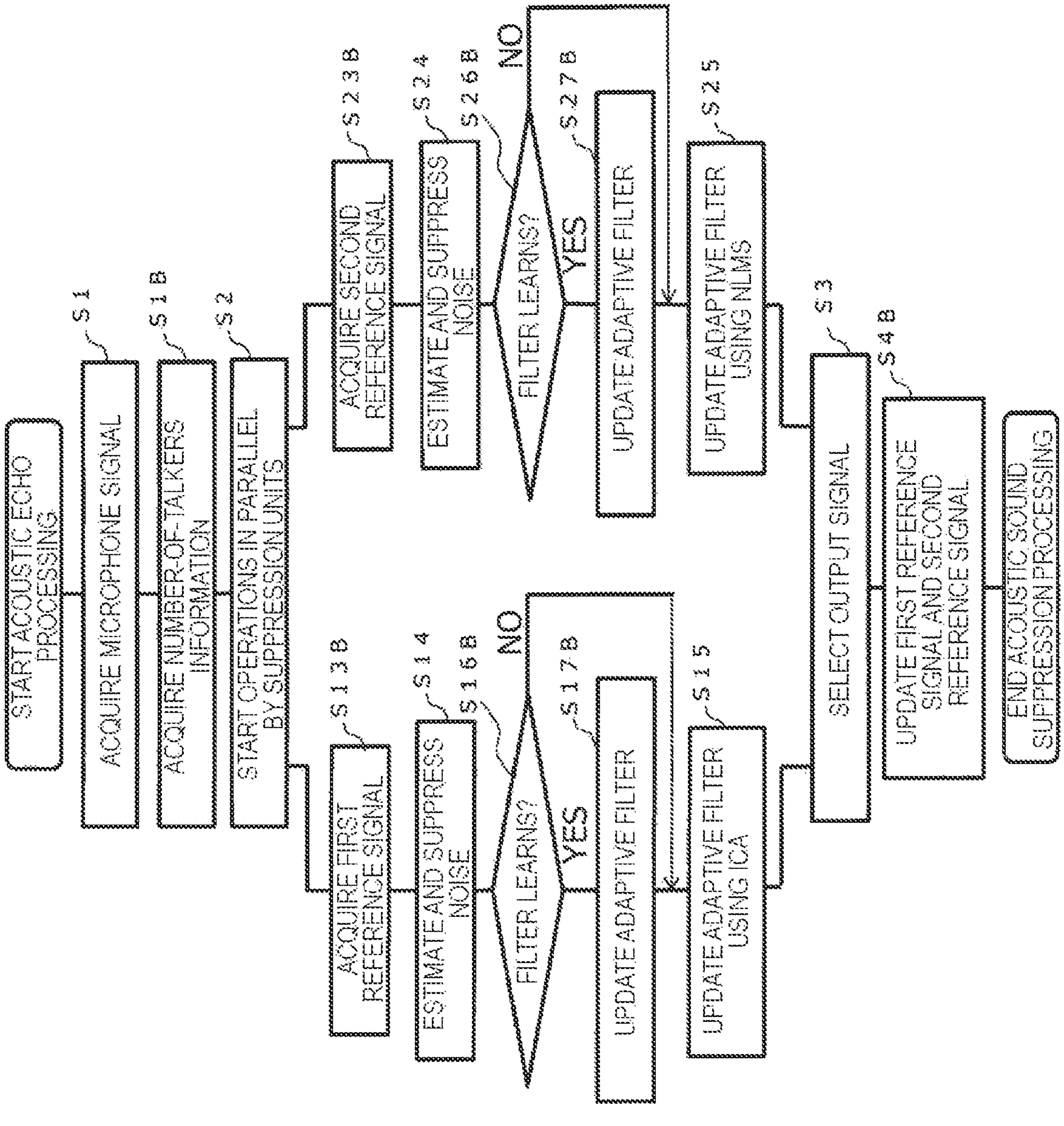
FIG. 11 is a flowchart showing an operation of the acoustic noise suppressing apparatus according to the third embodiment.

FIG. 11 is a flowchart showing an operation of the acoustic noise suppressing apparatus 05B according to the third embodiment. The same processing as that in the second embodiment is denoted by the same reference numeral as in FIG. 9, and a description thereof will be omitted.

The information acquisition unit 70B acquires number-of-talkers information (S1B).

The first filter updating unit 25B and the second filter updating unit 35B determine whether the audio signal acquired by the microphone ma is an audio signal suitable for updating each adaptive filter based on the number-of-talkers information acquired in step S1B (S16B, S26B). More specifically, when the number-of-talkers information indicates one or more persons, the first filter updating unit 25B determines that the audio signal is suitable for updating the adaptive filter 23. Further, when the number-of-talkers information indicates only one person, the second filter updating unit 35B determines that the audio signal is suitable for updating the adaptive filter 33. This is because the ICA used by the first filter updating unit 25B can learn while one or more persons are talking, whereas the NLMS used by the second filter updating unit 35B can perform updating with a particularly high accuracy while only one person is talking.

When the first filter updating unit 25B and the second filter updating unit 35B determine that the audio signal acquired by the microphone mcg is suitable for updating the adaptive filters managed by themselves, respectively, the adaptive filters are updated (517B, S27B). When it is determined that the audio signal is not suitable for the update, the audio signal after the suppression of the acoustic noise is output to the output signal selection unit without updating the adaptive filter.

Summary of Third Embodiment

As described above, the acoustic noise suppressing apparatus 05B of the third embodiment determines whether the acquired reference signal is an audio signal suitable for updating the adaptive filters, and updates the adaptive filters only when it is determined that the audio signal is suitable. As a result, especially for the NLMS, although the opportunity to update the adaptive filter is reduced as compared with the ICA, more accurate updating can be performed.

Further, even if the environment is not suitable for suppressing acoustic noise by one of the adaptive filters, the acoustic noise can be suppressed by the other adaptive filter, so that deterioration of sound quality can be suppressed.

In the above description, the third embodiment is described in the form of describing the difference with reference to the second embodiment. However, the idea of switching whether to update each adaptive filter based on the number-of-talkers information described in the third embodiment may be applied to the first embodiment. That is, the above-described idea can be applied regardless of whether the acoustic noise to be suppressed is the past sound output from the speaker or the sound uttered by another occupant.

Fourth Embodiment

In a fourth embodiment, an example is shown in which the acoustic noise can be suppressed with high accuracy when a talker who is talking is changed.

[Transmission Environment of Sound]

Figure 12:
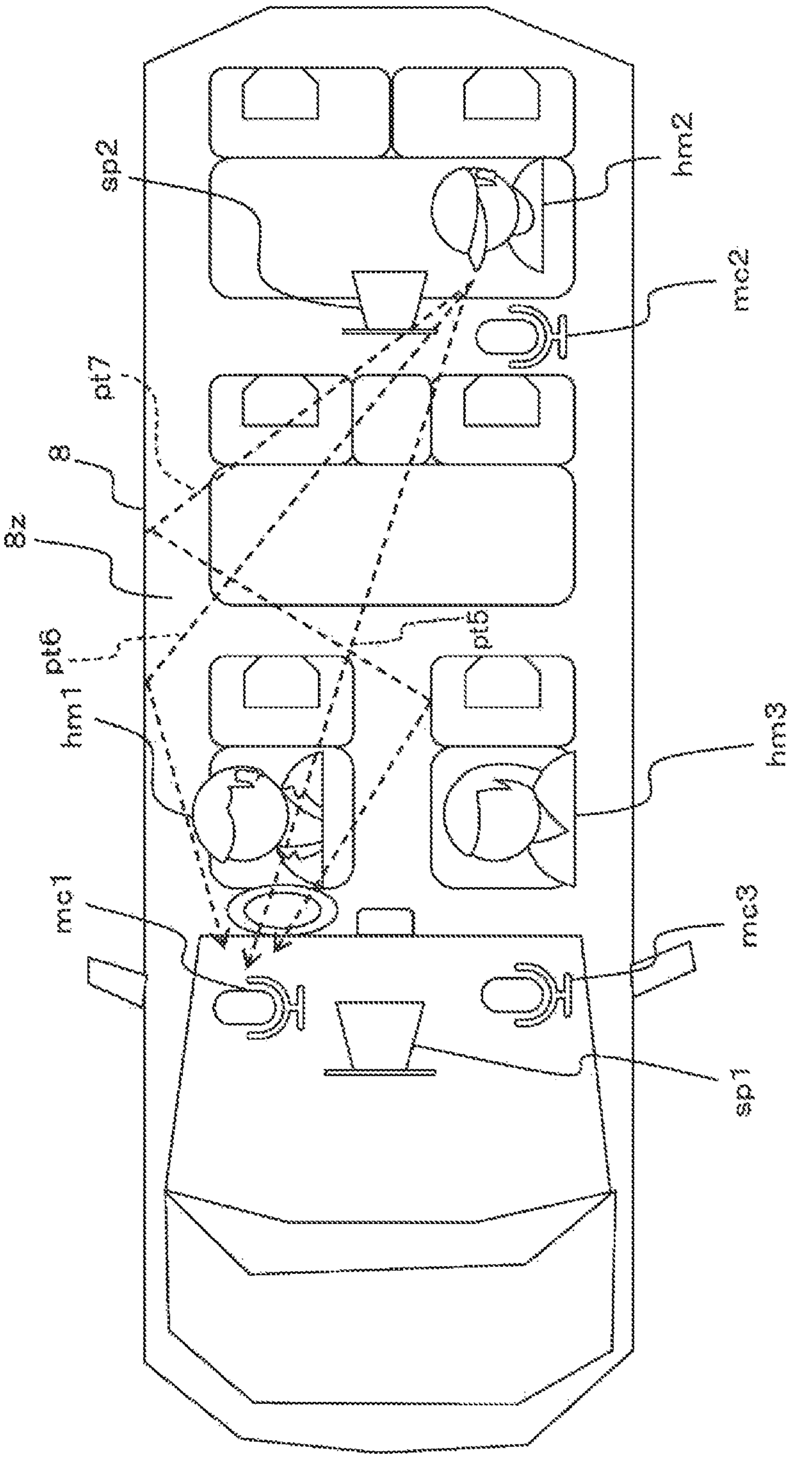
FIG. 12 is a diagram showing an example of transmission paths of direct waves and indirect waves in the vehicle interior according to a fourth embodiment.
Figure 13:
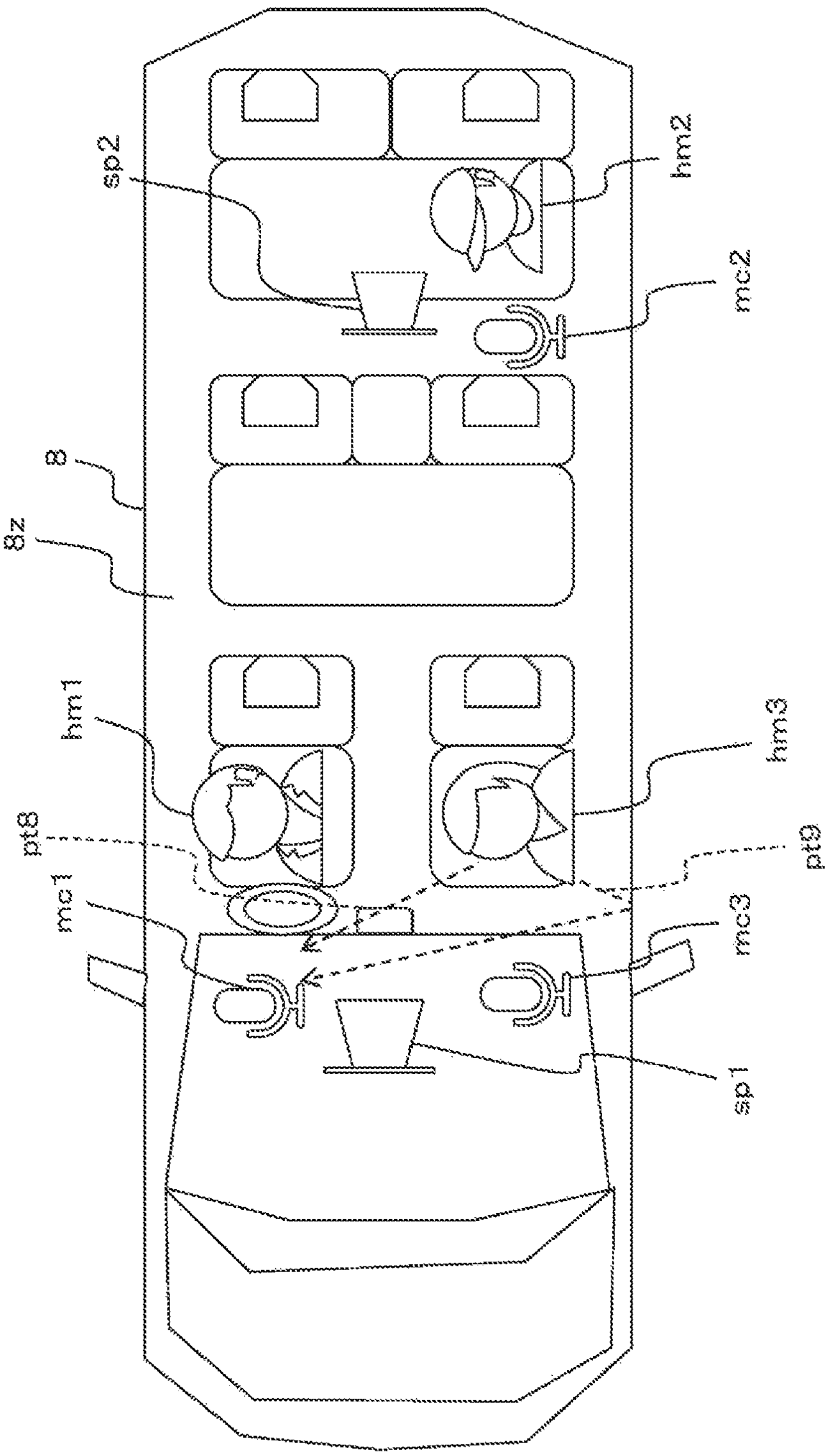
FIG. 13 is a diagram showing an example of transmission paths of direct waves and indirect waves in the vehicle interior according to the fourth embodiment.

In the fourth embodiment, a situation is assumed in which the person who is talking is changed between FIG. 12 and FIG. 13. That is, a situation is assumed in which an environment in which the occupant hm2 shown in FIG. 12 is talking and an environment in which an occupant hm3 shown in FIG. 13 is talking are switched.

In FIGS. 12 and 13, the microphone mc3 is installed in front of the eyes of the occupant hm3 seated on the passenger seat, and picks up the sound uttered by the occupant hm3.

FIG. 12 shows an example in which the sound uttered by the occupant hm2 is picked up by the microphone mc1. The microphone mc1 picks up the sound uttered by the occupant hm2 and reaching the microphone mc1 directly or indirectly via the transmission paths pt5, pt6, and pt7 in the vehicle interior 8*z* at the same time as the sound uttered by the driver hm1. Details of each transmission path are similar to those in the second embodiment, and a description thereof will be omitted.

FIG. 13 shows an example in which the sound uttered by the occupant hm3 is picked up by the microphone mc1. The microphone mc1 picks up the sound uttered by the occupant mc3 seated on the passenger seat and reaching the microphone mc1 directly or indirectly via the transmission paths pt8 and pt9 in the vehicle interior 8*z* at the same time as the sound uttered by the driver hm1. The transmission path pt8 is a transmission path of a direct wave in which the sound uttered by the occupant hm3 reaches the microphone mc1 directly. The transmission path pt9 is a transmission path of indirect wave in which the sound uttered by the occupant hm3 is reflected by the door on the passenger seat side and reaches the microphone mc1.

The transmission paths shown in FIG. 12 are examples, and the sound uttered by the occupant hm2 or the occupant hm3 is picked up by the microphone mc1 through various transmission paths. For the sake of simplicity, the following description will be made assuming that the transmission paths between the occupant hm2 and the microphone mc1 are pt5 to pt7 and the transmission paths between the occupant hm3 and the microphone mc1 are pt8 and pt9, but it goes without saying that there are various transmission paths in reality. The transmission characteristic in the vehicle interior 8*z* varies for each occupant. For example, for the occupant hm2, a combination of pt5 to pt7 and a transmission path (not shown) is the transmission characteristic in the vehicle interior 8*z*, and for the occupant hm3, a combination of pt8 and pt9 and a transmission path (not shown) is the transmission characteristic in the vehicle interior 8*z*. The transmission characteristic may be changed in a similar manner as in the other embodiments.

In the fourth embodiment, the sounds picked up by the microphone mc1 include not only the sound uttered by the driver hail but also the sound of the occupant hm2 reaching the microphone mc1 via the transmission paths pt5 to pt7, or the sound of the occupant hm3 reaching the microphone mc1 via the transmission paths pt8 and pt9. When the sounds picked up by the microphone mc1 are output from the speaker sp2 as they are, the sound uttered by the occupant hm2 or the sound uttered by the occupant hm3 is included as acoustic noise in the reproduced sound output from the speaker sp2. An acoustic noise suppressing apparatus 05C improves sound quality by suppressing such acoustic noise.

Hereinafter, an outline of processing performed by the acoustic noise suppressing apparatus 05C will be described. In each of FIGS. 12 and 13, the adaptive filters used for acoustic noise suppression learn in each transmission environment. Therefore, when the talkers are switched as shown in FIGS. 12 and 13, if the adaptive filter learning in one environment is used as the base of learning in another environment, it may take time until the acoustic noise is suppressed. Therefore, the acoustic noise suppressing apparatus 1750 stores the filter coefficients of the adaptive filters which learn in each environment, and reproduces the filter coefficients of the stored adaptive filters each time the talker is changed, and performs acoustic noise suppression and adaptive filter learning.

[Configuration of Acoustic Noise Suppressing apparatus]

Figure 14:
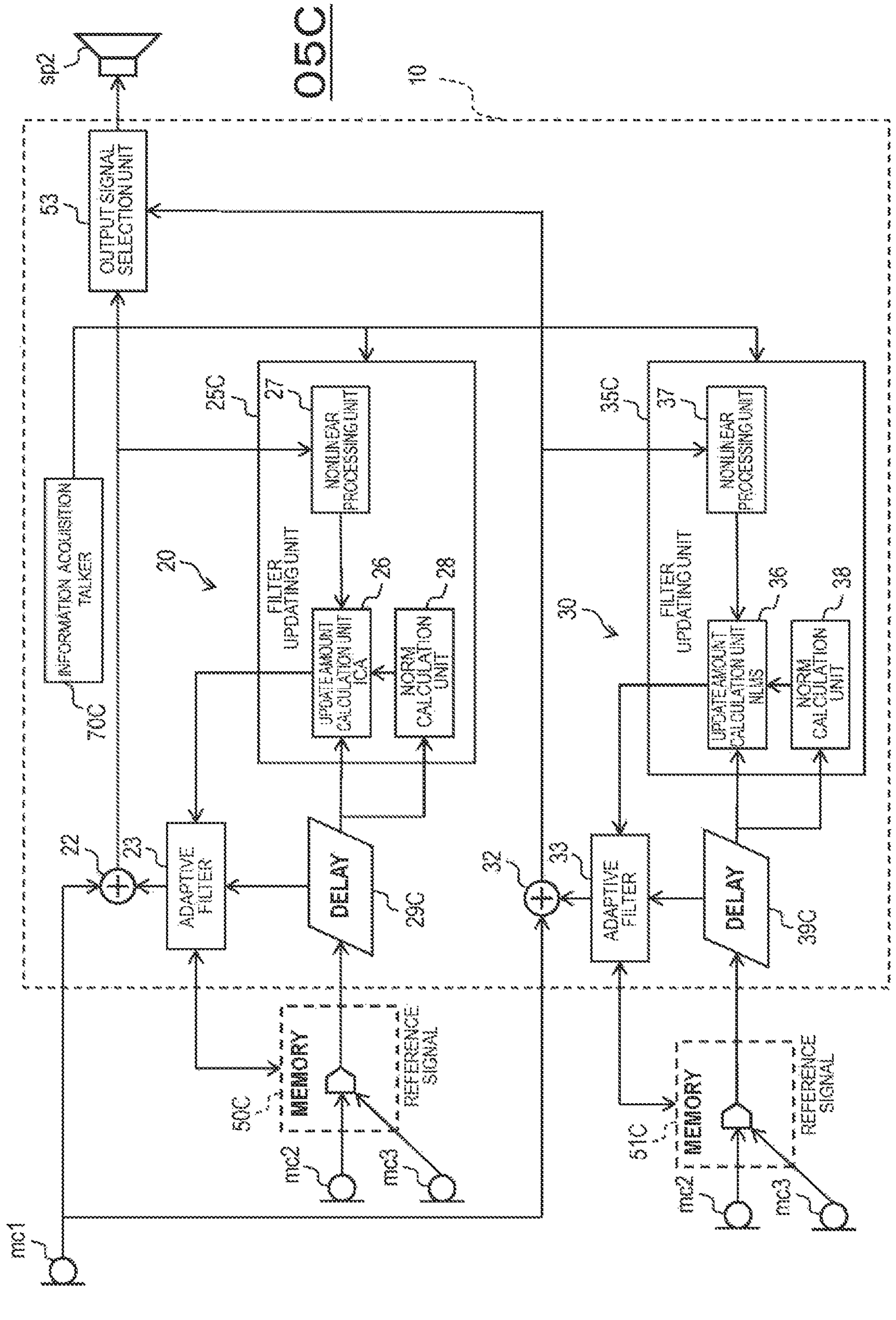
FIG. 14 is a block diagram showing a functional configuration of an acoustic noise suppressing apparatus according to the fourth embodiment.

FIG. 14 is a diagram showing a configuration of the acoustic noise suppressing apparatus 05C according to the fourth embodiment. Hereinafter, only differences from the second embodiment will be described.

An information acquisition unit 70C acquires talker identification information. Here, the talker identification information is information for identifying a talker who is talking. This information is estimated and generated based on a sound picked up by the microphone or an imaging result of a camera or the like. Specifically, if there is a microphone whose volume exceeds a predetermined threshold, it can be estimated that the talker assumed by the microphone is talking. Further, by using the camera, the talker can be identified by identifying the position of the occupant whose part corresponding to the mouth is moving.

A first filter updating unit 25C and a second filter updating unit 35C switch the filter coefficients of the adaptive filters according to the talker indicated by the talker identification information. Specifically, the filter coefficients of the adaptive filters are stored in a memory 50C and a memory 51C in association with the talker identification information, and are read out according to the current talker identification information. Then, after restoring the read coefficients to the adaptive filter 23 and the adaptive filter 33, learning is performed by each adaptive filter. The filter coefficient stored in each memory is updated each time the learning of the adaptive filter proceeds.

A delay 29C and a delay 39C switch delay time to delay time corresponding to the talker identification information. That is, if the talker indicated by the talker identification information is hm2, the delay time corresponding to the distance between hm2 and the microphone mc1 is used, and if the talker indicated by the talker identification information is hm3, the delay time corresponding to a distance between hm3 and the microphone mc1 is used. Thus, the reference signal is delayed by the time corresponding to each talker.

Since the operation of the learning of the adaptive filter itself and the operation of the other components are the same as those of the other embodiments, a description thereof is omitted.

[Acoustic Noise Suppressing operation]

Figure 15:
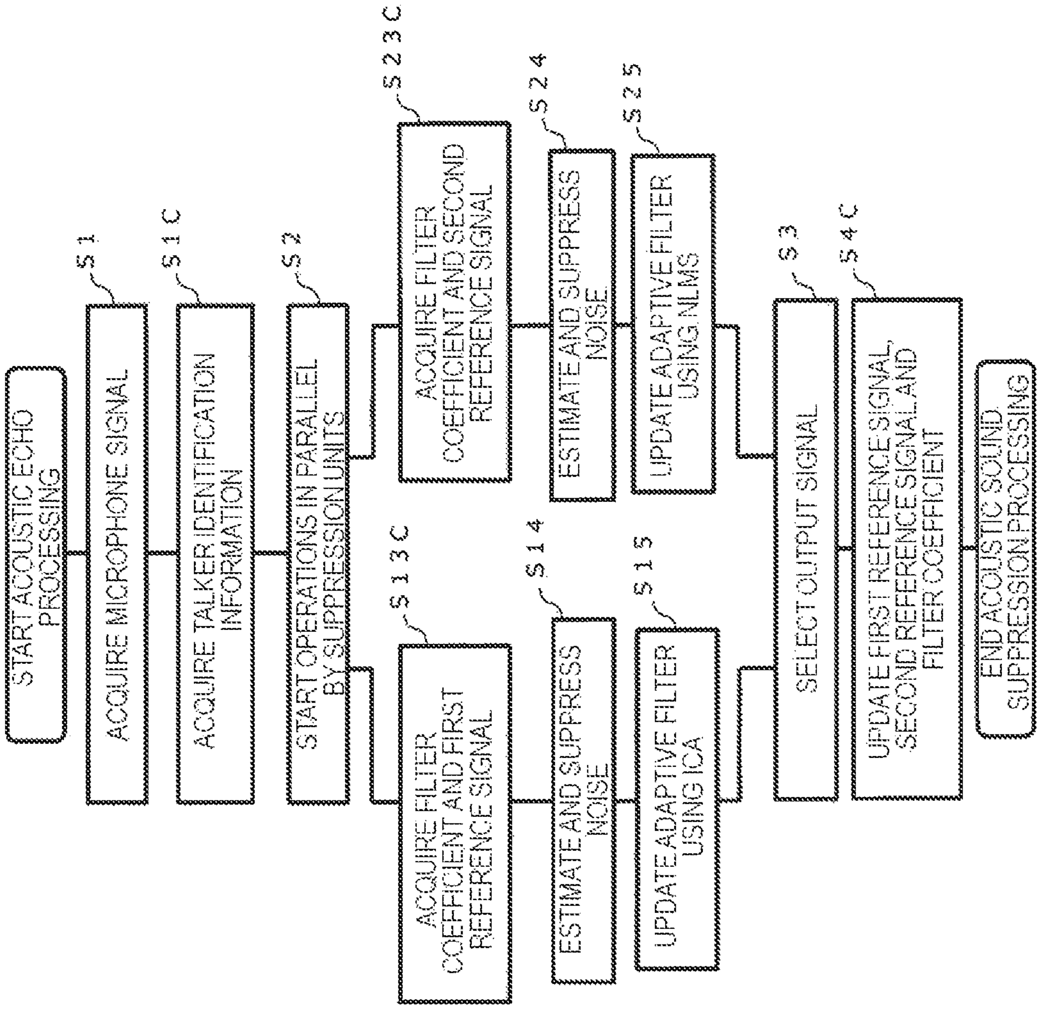
FIG. 15 is a flowchart showing an operation of the acoustic noise suppressing apparatus according to the fourth embodiment.

FIG. 15 is a flowchart showing an operation of the acoustic noise suppressing apparatus 05C according to the fourth embodiment. The same processing as that in the second embodiment is denoted by the same reference numeral as in FIG. 9, and a description thereof will be omitted.

The information acquisition unit 70C acquires talker identification information (S1C).

The first filter updating unit 25C and the second filter updating unit 35C acquire a first reference signal and a second reference signal from the memories 50C and 51C, respectively. At this time, the delay time in the delay 29C and the delay 39C is switched to the delay time corresponding to the talker indicated by the talker identification information. The filter coefficients corresponding to the acquired talker identification information among the past filter coefficients of the adaptive filter 23 and the adaptive filter 33 are acquired from the memory 50C and the memory 51C, respectively. Then, the first filter updating unit 25C and the second filter updating unit 35C reflect the acquired filter coefficients in the adaptive filter 23 and the adaptive filter 33 (S13C, S23C).

After each adaptive filter is updated and the output signal is selected, the DSP 10 stores the first reference signal and the second reference signal in the memory 50 and the memory 51C, respectively. The DSP 10 stores the latest filter coefficients of the adaptive filter 23 and the adaptive filter 33 in the memory 50C and the memory 51C in association with the current talker identification information (S4C).

Accordingly, the latest filter coefficients corresponding to the talker identification information are always stored in the memories 50C and 51C, respectively. Therefore, by reading and restoring the filter coefficients in accordance with the acquired talker identification information, the acoustic noise can be suppressed by the adaptive filter having a coefficient corresponding to each talker even when the talker is changed.

Summary of Fourth Embodiment

As described above, the acoustic noise suppressing apparatus according to the fourth embodiment switches the microphones to be referred to as the filter coefficients and the reference signals based on the talker identification information. The filter coefficient is stored for each talker, and the acoustic noise suppression and the update of the adaptive filter are performed using the audio signal of the microphone that picks up the sound of the talker. Accordingly, the filter coefficient can be properly used for each talker, and the filter can learn using the audio signal corresponding to each talker.

Further, although the configuration in which the filter coefficient of the adaptive filter is stored in the memory every time is described in the above example, the filter coefficient may be stored once every several times or when it is detected that the talker is changed. Accordingly, since the number of times the filter coefficient of the adaptive filter is stored in the memory can be reduced, a processing load can be reduced.

Although the configuration in which the filter coefficient of the adaptive filter is stored and properly used for each talker is described in the above example, the number of taps of the adaptive filter and the like may be stored for each talker and properly used. That is, the type of the parameter does not matter as long as the parameter of the adaptive filter is properly used for each talker.

Fifth Embodiment

In a fifth embodiment, an example is shown in which a sound uttered by a person other than the person assumed to be a sound pick-up target of a microphone is suppressed by using three microphones.

[Transmission Environment of Sound]

Figure 16:
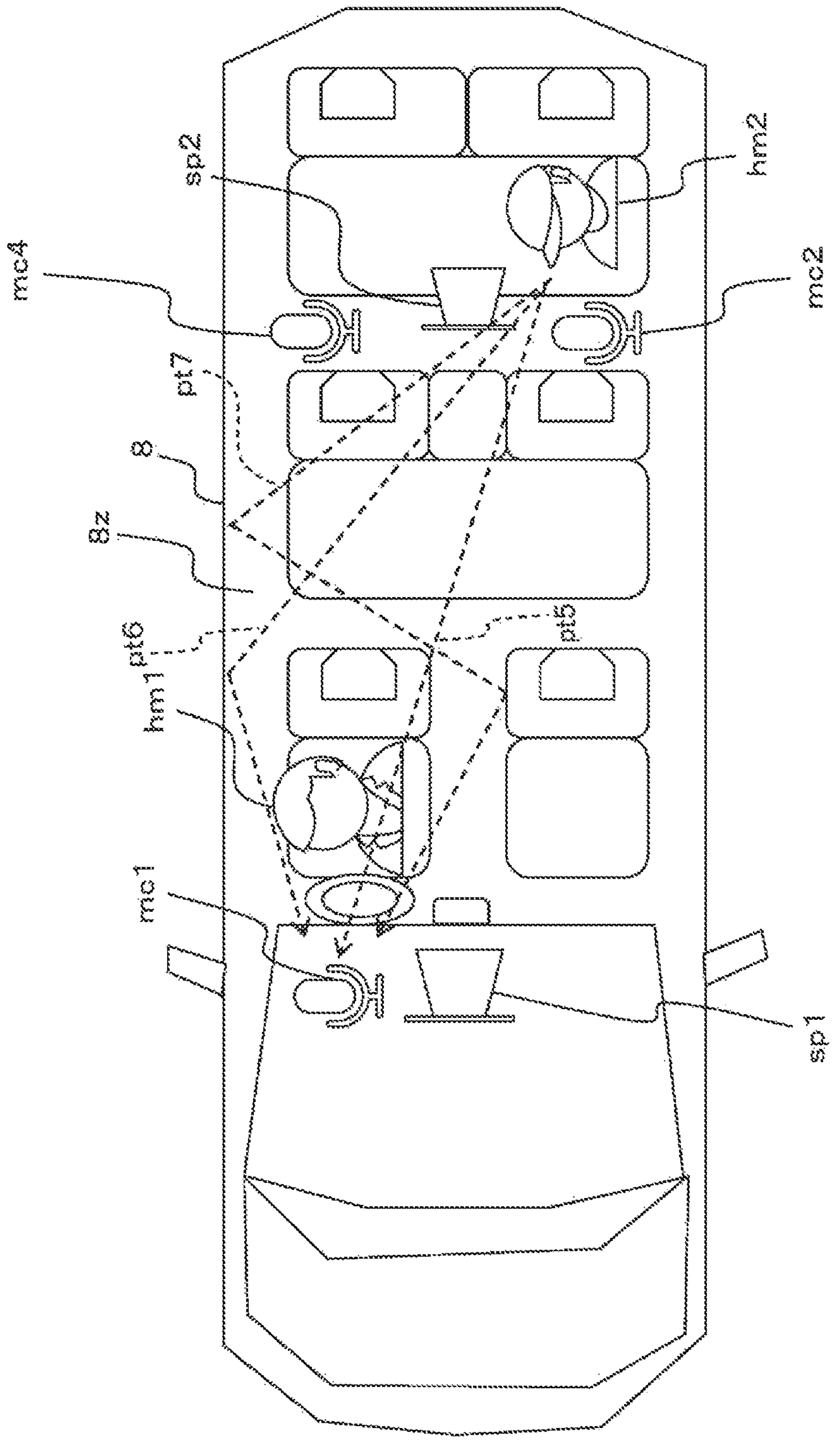
FIG. 16 is a diagram showing an example of transmission paths of direct waves and indirect waves in the vehicle interior according to a fifth embodiment.

A transmission environment of a sound assumed in the fifth embodiment will be described with reference to FIG. 16. The same components as those in the second embodiment are denoted by the same reference numerals as in FIG. 7, and a description thereof will be omitted except that a microphone mc4 is added.

In the fifth embodiment, the microphone mc4 is installed somewhere in the vehicle. As an example, it is assumed that the microphone mc4 is installed in front of the rear seat on the right side. As a result, the sound uttered by the occupant hm2 is also recorded in the microphone mc4.

[Configuration of Acoustic Noise Suppressing Apparatus]

Figure 17:
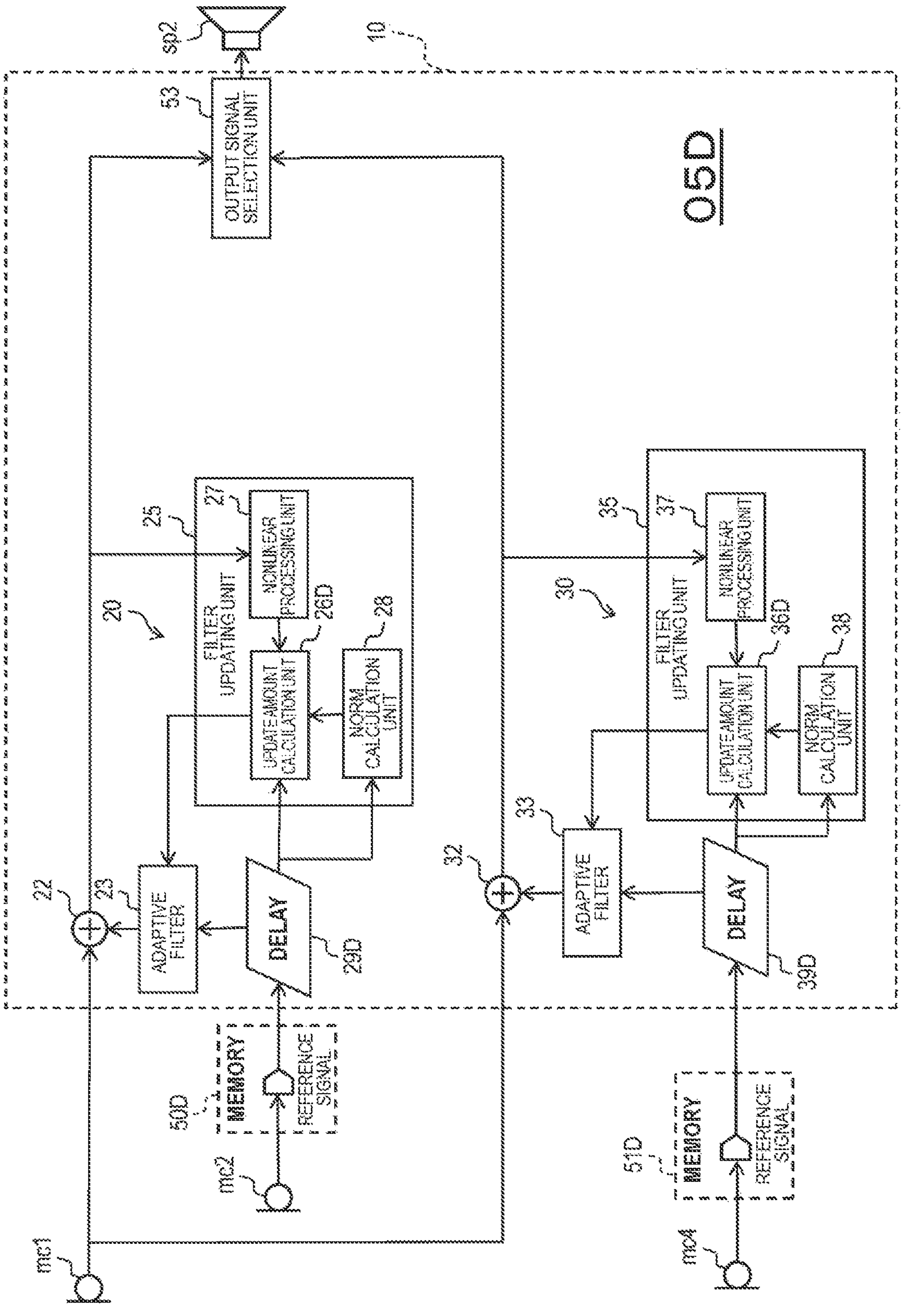
FIG. 17 is a block diagram showing a functional configuration of an acoustic noise suppressing apparatus according to a fifth embodiment.

FIG. 17 is a block diagram showing a functional configuration of an acoustic noise suppressing apparatus 05D according to the fifth embodiment. The same components as those in the second embodiment are denoted by the same reference numerals as in FIG. 8, and a description thereof will be omitted.

Since the basic configuration of the acoustic noise suppressing apparatus 05D and the principle of acoustic noise suppression are similar to those of the acoustic noise suppressing apparatus 05A in the second embodiment, hereinafter, differences from the acoustic noise suppressing apparatus 05A will be mainly described.

In the fifth embodiment, the audio signal of the occupant hm2 acquired by the microphone mcg is stored in a memory 50D as a first reference signal, and the audio signal of the occupant hm4 acquired by the microphone mc4 is stored in a memory 51D as a second reference signal, respectively. That is, the acoustic noise suppressing apparatus 05D suppresses the acoustic noise based on the sound of the occupant hm2 picked up by the microphone mc2 and the microphone mc4.

A delay 29D delays the first reference signal. Specifically, the delay 29D delays the first reference signal by a delay time X corresponding to the distance between the occupant hint and the microphone mc1. The delay time X is similar to the delay time of the delay 29A in the second embodiment, and a description thereof will be omitted.

A delay 39D delays the second reference signal. A delay time is a time based on a distance between the microphone mc1 and the occupant hm2 and a distance between the microphone mc4 and the occupant hm2. Specifically, a time obtained by subtracting a delay time Y between the occupant hm2 and the microphone mc4 from the delay time X described above is delayed by the delay 39D. The reason why such a delay time is used will be described below. Since the microphone mc4 is a microphone that is not originally intended to pick up the sound of the occupant hm2, the delay in the distance between the microphone mc4 and the occupant hm2 cannot be ignored. Therefore, when the delay time X is used in the delay 39D, an extra time of the delay time Y is delayed. In order to match the timing of the reference signals used for suppressing the acoustic noise, in the fifth embodiment, the sound picked up by the microphone mc4 is delayed by the time obtained by subtracting the delay time Y from the delay time X.

An update amount calculation unit 26D calculates the update amount of the adaptive filter 23 based on the delayed sound of the occupant hm2 which is picked up by the microphone mcg and received from the delay 29D. The details of the calculation of the update amount are similar to those in the other embodiments, and a description thereof will be omitted.

An update amount calculation unit 36D calculates the update amount of the adaptive filter 33 based on the sound of the occupant hm2 which is picked up by the microphone mc4 and received from the delay 39D. The details of the calculation of the update amount are similar to those in the other embodiments, and a description thereof will be omitted.

Since other configurations are similar to those of the second embodiment, a description thereof will be omitted.

[Acoustic Noise Suppressing Operation]

Figure 18:
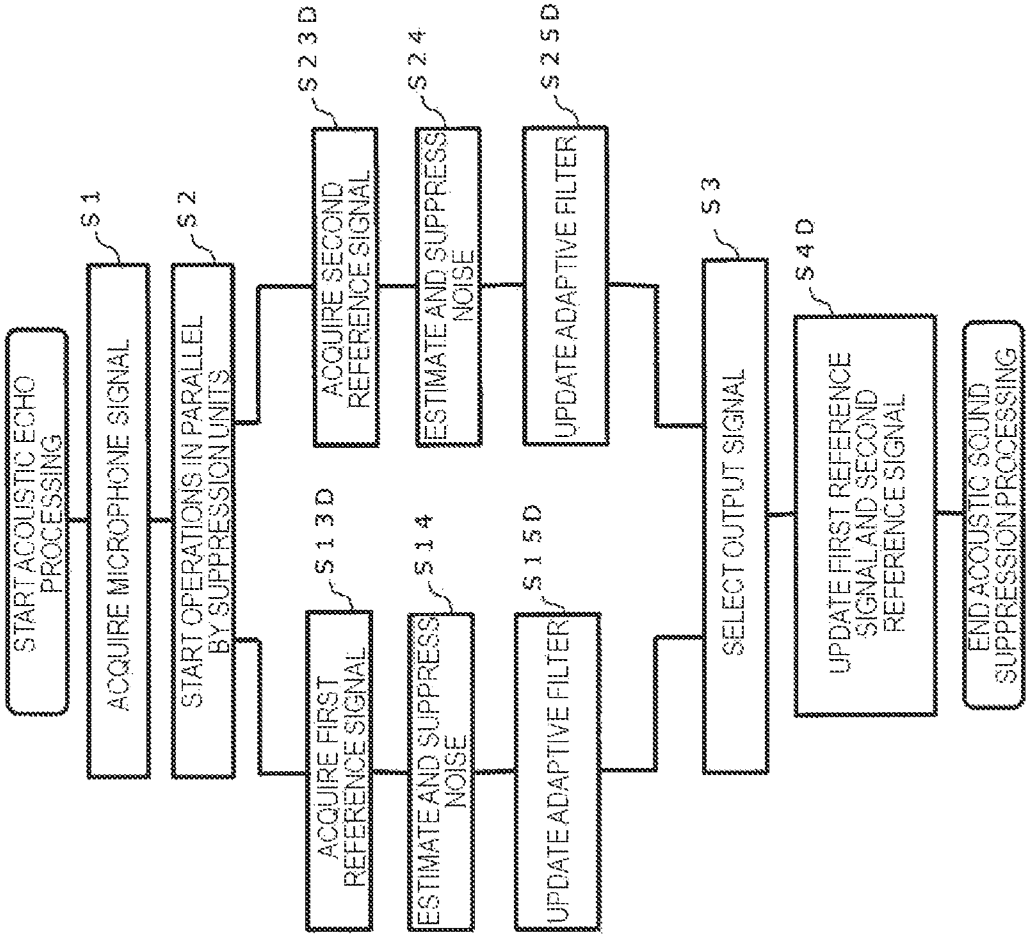
FIG. 18 is a flowchart showing an operation of the acoustic noise suppressing apparatus according to the fifth embodiment.

FIG. 18 is a flowchart showing an operation of the acoustic noise suppressing apparatus 05D according to the fifth embodiment. The same processing as that in the second embodiment is denoted by the same reference numeral as in FIG. 9, and a description thereof will be omitted.

The first filter updating unit 25 acquires, as the first reference signal, a sound which is picked up by the microphone mc2, stored in the memory 50D, and delayed by the delay 29D (S13D).

The second filter updating unit 35 acquires a sound which is picked up by the microphone mc4, stored in the memory 51D, and delayed by the delay 39D, as the second reference signal (S23D).

The first filter updating unit 25 calculates an update amount of a filter characteristic based on the first reference signal (S15D).

The second filter updating unit 35 calculates an update amount of a filter characteristic based on the second reference signal (S25D).

The audio signal picked up by the microphone mc2 is stored in the memory 50D as the first reference signal, and the audio signal picked up by the microphone mc4 is stored in the memory 51D as the second reference signal (S4D).

In the above description, the sound of the occupant hm2 stored in the memory 50D and the memory 51D is updated after the selection of the output signal. However, since the sound of the occupant hm2 is independent of the sound output from the speaker sp2, the sound may be updated at another timing.

Summary of Fifth Embodiment

As described above, in the acoustic noise suppressing apparatus 05D of the fifth embodiment, it is possible to output an appropriate sound among the result of suppressing the acoustic noise based on the sound picked up by the microphone mc2 and the result of suppressing the acoustic noise based on the sound picked up by the microphone mc4. This configuration is effective when the microphone mc2 cannot always optimally pick up the sound of the occupant hm2, for example, when there is a possibility that an obstacle exists between the microphone mc2 and the occupant hm2.

That is, the acoustic noise suppressing apparatus 05D of the fifth embodiment may be configured to suppress the acoustic noise generated by the sound uttered by any occupant (including a driver) existing in the environment to improve sound quality in this case, the acoustic noise suppressing apparatus 05D has a function of suppressing the acoustic noise which corresponds to the number of combinations of microphones and occupants. A description of the configuration and processing procedure in each combination will be omitted since only a combination of the target occupant and the microphone to be used in the configuration of the above-described embodiment changes.

In the acoustic noise suppressing apparatus 05D of the fifth embodiment, the algorithms for updating the adaptive filters may be the same or different.

Sixth Embodiment

In each of the embodiments described above, an example is described in Which parameters of the adaptive filters are updated by each suppression unit. However, when the mounting method of the adaptive filters is the same (an FIR filter in each of the above-described embodiments) as in each of the above-described embodiments, the parameters of one of the adaptive filters can be reflected in the other adaptive filter. Therefore, in a sixth embodiment, an example is shown in which a parameter of an adaptive filter that can suppress acoustic noise among a plurality of adaptive filters is applied to next acoustic noise suppression. Further, the sound transmission environment is similar to that of the first embodiment, and a description thereof will be omitted. In the following description, the filter coefficient is described as an example of the parameters of the adaptive filter, but other parameters such as the number of taps may be used in a similar manner as in the other embodiments.

Hereinafter, an outline of processing performed by an acoustic noise suppressing apparatus 05E according to the sixth embodiment will be described. The acoustic noise suppressing apparatus 05E stores the filter coefficient of the adaptive filter that can suppress the acoustic noise among a plurality of adaptive filters, and restores the stored filter coefficient of the adaptive filter to each adaptive filter before the suppression of the acoustic noise is performed. By performing the learning of the adaptive filter based on the restored adaptive filter, the parameter of the adaptive filter, which can suppress acoustic noise when acoustic noise was previously suppressed, can be used as a basis for learning of other adaptive filters.

[Configuration of Acoustic Noise Suppression]

Figure 19:
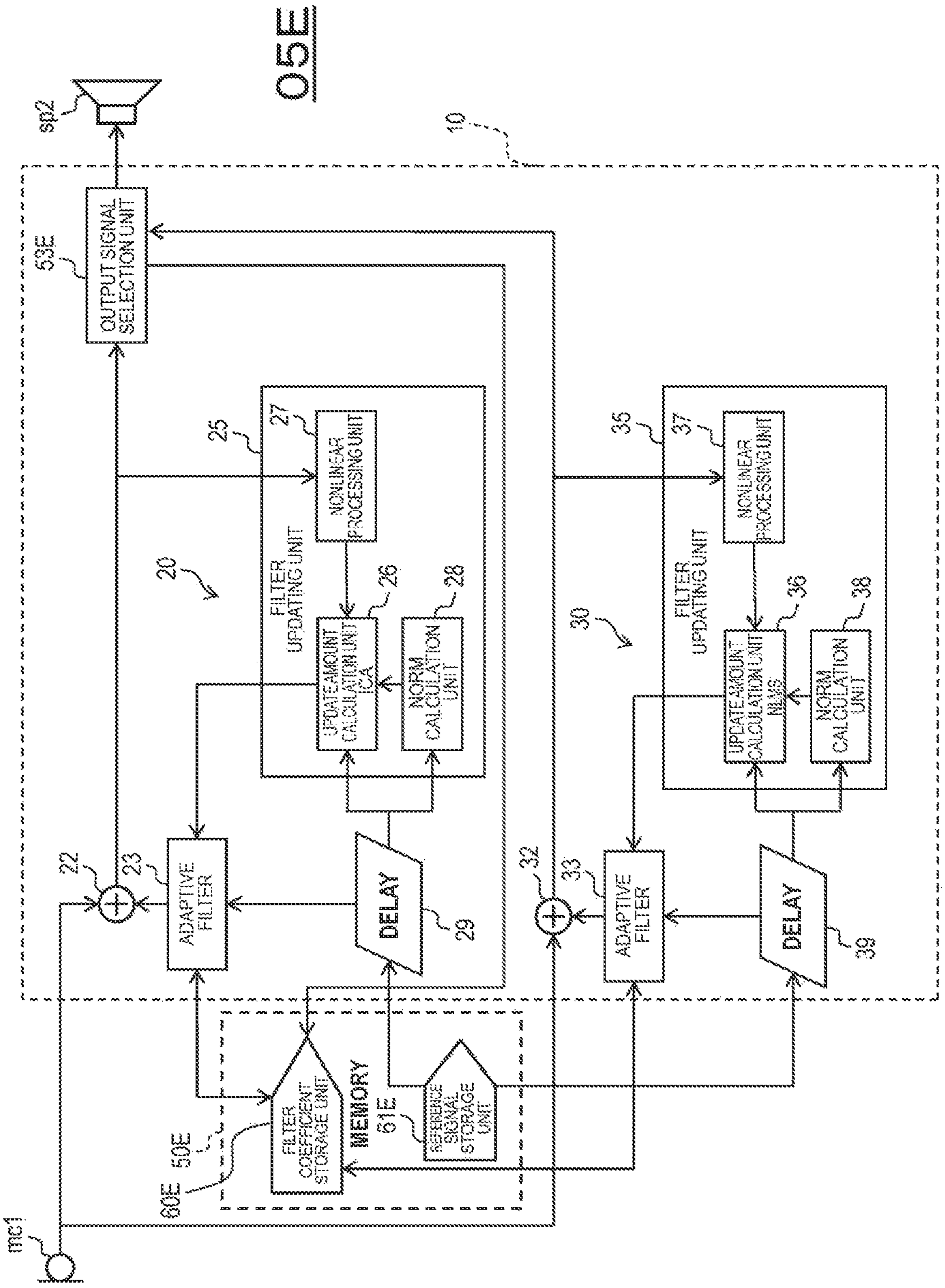
FIG. 19 is a block diagram showing a functional configuration of an acoustic noise suppressing apparatus according to a sixth embodiment.

FIG. 19 is a diagram showing a configuration of the acoustic noise suppressing apparatus 05E according to the sixth embodiment. Hereinafter, only differences from the first embodiment will be described.

As shown in FIG. 19, a memory 50E includes a filter coefficient storage unit 60E and a reference signal storage unit 61E.

The filter coefficient storage unit 60E stores the filter coefficient to be restored to the adaptive filter 23 and the adaptive filter 33. The filter coefficient storage unit 60E acquires and stores the filter coefficient of the adaptive filter through which the acoustic noise is further suppressed based on an acoustic noise suppression result from an output signal selection unit 53E. Here, the acoustic noise suppression result may be information of an adaptive filter through which acoustic noise is further suppressed, or may be information of a suppression unit in which acoustic noise is further suppressed. That is, any information can be used as long as the information can identify an adaptive filter through which acoustic noise is further suppressed. In the present embodiment, the filter coefficient storage unit 60E in the memory 50E determines the filter coefficient to be stored based on the acoustic noise suppression result, but this determination may be made by a configuration outside the memory such as the DSP 10.

The reference signal storage unit 61E stores the reference signal to be sent to the delay 29 and the delay 39. In the reference signal storage unit 61E according to the sixth embodiment, the signal of the sound output from the speaker sp2 in the past is stored as a reference signal. In the present embodiment, since a first reference signal and a second reference signal are the same, the description will be made assuming that the same reference signal is stored in the same storage unit as a single reference signal. As in other embodiments, the first reference signal and the second reference signal may be separately stored.

In addition to the selection of the audio signal to be output from the speaker sp2, the output signal selection unit 53E outputs the above-described acoustic noise suppression result to the filter coefficient storage unit 60E.

[Acoustic Noise Suppressing operation]

Figure 20:
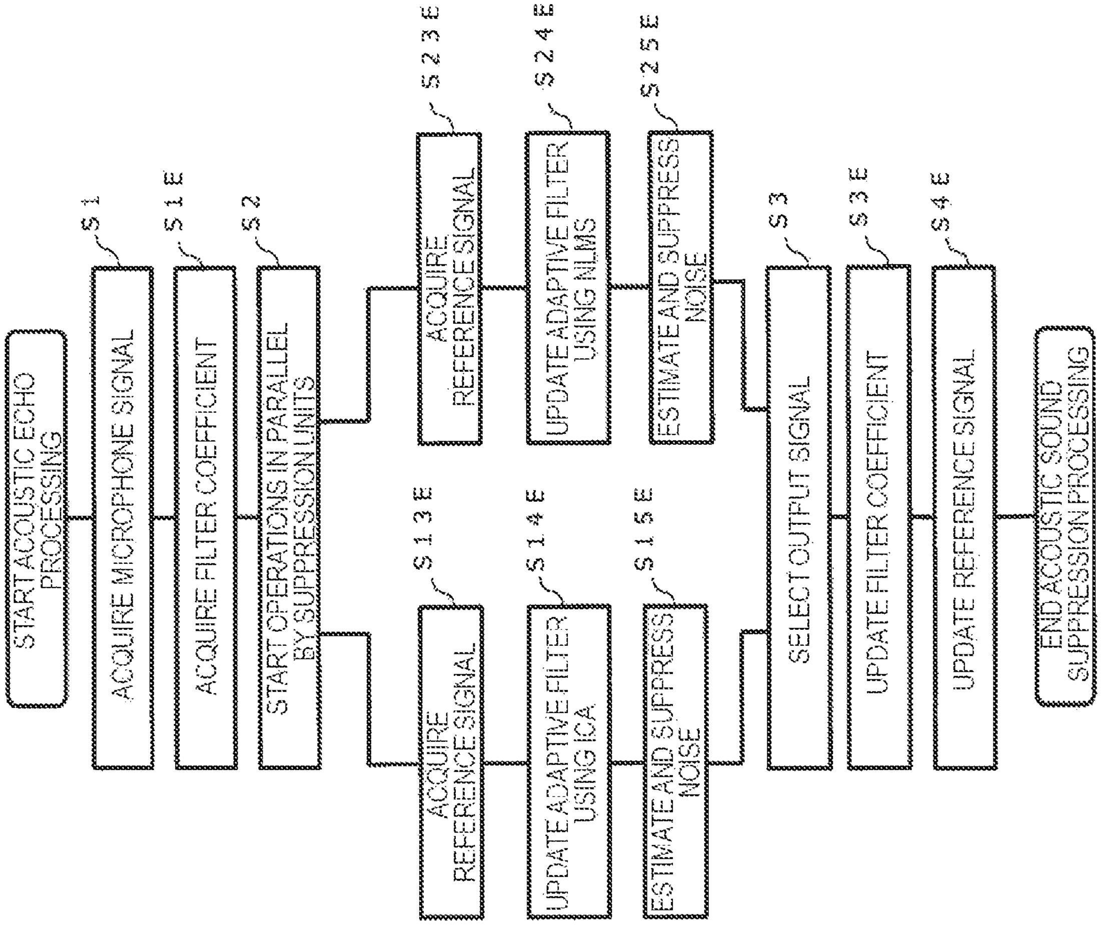
FIG. 20 is a flowchart showing an operation of the acoustic noise suppressing apparatus according to the sixth embodiment.

FIG. 20 is a flowchart showing an operation of the acoustic noise suppressing apparatus 05E according to the sixth embodiment. The same processing as that in the first embodiment is denoted by the same reference numeral as in FIG. 4, and a description thereof will be omitted.

The adaptive filter 23 and the adaptive filter 33 acquire the filter coefficient stored in the filter coefficient storage unit 60E, and restore the acquired filter coefficient to themselves (S1E).

The delay 29 acquires a reference signal stored in the reference signal storage unit 61E as the first reference signal (S13E).

The delay 39 acquires a reference signal stored in the reference signal storage unit 61E as the second reference signal (S23E).

The first filter updating unit 25 calculates an update amount of a filter characteristic and updates the characteristic of the adaptive filter 23. Here, the first filter updating unit 25 calculates the update amount of the filter characteristic by the ICA (S14E).

The second filter updating unit 35 calculates an update amount of a filter characteristic and updates the characteristic of the adaptive filter 33. Here, the second filter updating unit 35 calculates the update amount of the filter characteristic by the NLMS (S24E). The first suppression unit 20 generates a pseudo noise signal by using the first reference signal delayed by the delay 29 by a predetermined time corresponding to the distance between the speaker sp2 and the microphone mc1 and the updated adaptive filter 23. Then, the pseudo noise signal is added (subtracted) to (from) the audio signal of the sound picked up by the microphone mc1 by the adder 22. Accordingly, the first suppression unit 20 generates a signal after the suppression of the acoustic noise by subtracting the pseudo noise signal from the audio signal of the sound picked up by the microphone mc1. Since the generated signal after the suppression of the acoustic noise is used for next update processing of the filter coefficient, the signal is output to the first filter updating unit 25 regardless of whether the signal is finally output from the speaker sp2 (S15E). In the present embodiment, the filter characteristics of the adaptive filter 23 and the adaptive filter 33 become the same in step S1E. Therefore, in order to provide a difference between the generated pseudo noise signal and the signal after the suppression of the acoustic noise, the adaptive filter 23 and the adaptive filter 33 are updated before the generation of the pseudo noise signal.

The second suppression unit 30 generates a pseudo noise signal by using the second reference signal delayed by the delay 39 by a predetermined time corresponding to the distance between the speaker sp2 and the microphone mc1 and the updated adaptive filter 33. Then, the pseudo noise signal is added (subtracted) to (from) the audio signal picked up by the microphone mc1 by the adder 32. Accordingly, the second suppression unit 30 generates a signal after the suppression of the acoustic noise by subtracting the pseudo noise signal from the audio signal picked up by the microphone mc1. Since the generated signal after the suppression of the acoustic noise is used for next update processing of the filter coefficient, the signal is output to the second filter updating unit 35 regardless of whether the signal is finally output from the speaker sp2 (S25E).

The filter coefficient storage unit 60E acquires and store the filter coefficient of the adaptive filter 23 or the adaptive filter 33 based on the acoustic noise suppression result reported from the output signal selection unit 53E (S3E).

The reference signal storage unit 61E stores, as a reference signal, a signal selected as a signal to be output from the speaker by the output signal selection unit 53E (S4E).

Summary of Sixth Embodiment

As described above, the acoustic noise suppressing apparatus 05E of the sixth embodiment stores the filter coefficient of the adaptive filter that can further suppress the acoustic noise among a plurality of adaptive filters, restores the stored filter coefficient, and uses the filter coefficient for the next acoustic noise suppression. Accordingly, the learning speed of the filter coefficient of the adaptive filter can be increased.

Further, the acoustic noise suppressing apparatus 05E of the sixth embodiment updates and stores the filter coefficient of the adaptive filter than can further suppress the acoustic noise among a plurality of adaptive filters. After the stored filter coefficient is applied to the adaptive filters of both the first suppression unit 20 and the second suppression unit 30, the adaptive filters learn by the respective suppression units to suppress the acoustic noise. Accordingly, since the acoustic noise is suppressed on the basis of the previous result of further suppressing the acoustic noise, it is possible to efficiently suppress the acoustic noise.

The acoustic noise suppressing apparatus 05E of the sixth embodiment uses different algorithms for the first filter updating unit 25 and the second filter updating unit 35 that update the adaptive filters. Therefore, the first filter updating unit 25 and the second filter updating unit 35 have different environments in which the adaptive filters can be appropriately updated. Therefore, even if the environment is not suitable for one filter updating unit to update the filter, the other filter updating unit can appropriately update the filter, so that deterioration of the adaptive filter can be suppressed.

In the acoustic noise suppressing apparatus 05E of the sixth embodiment, the memory 50E stores the first reference signal and the second reference signal as the same reference signal, and delays acquire the same reference signal as the first reference signal or the second reference signal. Accordingly, it is not necessary to store the first reference signal and the second reference signal separately; so that the amount of data of the reference signal can be suppressed. Note that the configuration of the memory 50E is an example, and various pieces of information may be acquired from other elements, and the information may be temporarily or permanently stored.

In the above description, the sixth embodiment is described with reference to the first embodiment in a form of describing the difference. However, as described in the sixth embodiment, the idea of adapting a filter coefficient that can further suppress the acoustic noise in the plurality of adaptive filters to the next acoustic noise suppression may be applied to the second to fifth embodiments. However, when applied to the second to fifth embodiments, it is necessary to change the processing order of the acoustic noise suppression and the filter update as described in the above description of the operation.

Further, as described in the sixth embodiment, the idea of storing the first reference signal and the second reference signal in the memory as one reference signal and acquiring the one reference signal as the first reference signal or the second reference signal in the delay may be applied to other embodiments. If the first reference signal and the second reference signal are the same as in the second and third embodiments, the memory may store the first reference signal and the second reference signal as one reference signal. Further, if the reference signal is different for each talker as in the fourth embodiment, the memory may store one reference signal for each piece of talker identification information. That is, each idea shown in the sixth embodiment can be applied to the acoustic noise suppressing apparatus as shown in each of the embodiments, that is, the acoustic noise suppressing apparatus that suppresses the acoustic noise after updating the filter.

(Other Modifications)

In the first to fourth embodiments described above, the algorithm used to update the adaptive filter is described as the ICA and the NLMS. However, other combinations of algorithms may be used. Further, the same algorithm but different parameters may be used. For example, NLMS having different update cycles may be used in the first processing system and the second processing system. Here, in the NLMS having a long update cycle, characteristics of the adaptive filter are stable instead of slowly following an environment change. Here, in the NLMS having a short update cycle, characteristics of the adaptive filter are unstable instead of quickly following an environment change. Therefore, by selecting the output result in which the acoustic noise is further suppressed from these processing systems, it is possible to suppress the acoustic noise in both an environment with great change and an environment with little change. Incidentally, unless otherwise specified, the same algorithm with different parameters may be considered to be a different algorithm.

Although the above embodiments have been described using two processing systems, three or more processing systems may be used. For example, in the first processing system, the filter is updated using the ICA, and in the second processing system and the third processing system, the filter is updated using the NLMS having different update cycles. As a result, the acoustic noise can be suppressed in response to changes in the number of talkers who talk simultaneously and sudden changes in the environment.

In each of the embodiments described above, description has been made by using the configuration in which the acoustic noise suppression is performed once for the audio signal acquired by the microphone mc1, However, the acoustic noise is suppressed more than once for the audio signal acquired by the microphone mc1. For example, after the acoustic noise is suppressed by using the adaptive filter 23, it is conceivable to suppress the acoustic noise by using the adaptive filter 33. In this case, by using the adaptive filters having different characteristics, acoustic noise that cannot be suppressed by one filter can be suppressed by the other filter. As a method of making the characteristic of the adaptive filter different, as in each of the embodiments described above, a method of differentiating the learning environment or the update cycle of the adaptive filter may be considered even when the algorithm used for calculating the update amount is different or the same algorithm is used. Further, adaptive filters having the same characteristic may be used to suppress the acoustic noise a plurality of times. As a result, the effect of suppressing the acoustic noise by the adaptive filter is more remarkably exhibited. In this way, by performing the acoustic noise suppression processing a plurality of times on the audio signal, the acoustic noise can be suppressed in a wider environment.

In the above-described embodiments, the suppression of the acoustic noise in the vehicle interior has been described as an example, but the present invention is not limited thereto. The embodiments described above can also be applied to other environments such as a conference room. In the above-described embodiments described above, since the value of the delay is calculated based on actual measurement, it is desirable to measure the distance between the sound source of the acoustic noise and the microphone. However, if the delay is not extremely changed, a certain degree of error can be absorbed by the learning of the adaptive filter, so that the effect of acoustic noise suppression according to each embodiment can be obtained even in an environment where it is difficult to measure the distance.

In the above-described embodiments, by delaying the reference signal by the delay, the timing is adjusted according to the distance between each speaker and the microphone. However, if the reference signal can be stored in a sufficient length in the memory, a portion corresponding to an appropriate timing among the stored reference signals may be extracted.

In each embodiment, the algorithm used to update the adaptive filter is merely an example. As the algorithm used for updating the adaptive filter, various algorithms other than ICA and NLMS are known. The adaptive filter may be updated by other known algorithms without departing from the spirit of the embodiments.

In the first to fifth embodiments, each processing system updates the filter after the acoustic noise is suppressed, but the acoustic noise may be suppressed after the filter is updated. Even if the order is changed, the acoustic noise can be suppressed.

The present disclosure can be expressed as an acoustic noise suppressing apparatus or an acoustic noise suppressing method executed in a control device. Further, the present disclosure can also be expressed as a program for causing a computer to execute such a method. Further, the present disclosure can also be expressed as a recording medium in which such a program is recorded in a state of being readable by a computer. That is, the present disclosure can be expressed in any category among the device, the method, the program, and the recording medium.

Further, each functional block used in the description of each of the embodiments (including the modifications) is partially or entirely implemented as an LSI which is an integrated circuit, and each process described in the above embodiments may be partially or entirely controlled by a single LSI or a combination of LSIs. The LSI may be provided with individual chips, or may be provided with one chip so as to include a part or all of the functional blocks. The LSI may include data input and output. The LSI may be referred to as an IC, a system LSI, a super LSI, or an ultra LSI depending on a degree of integration.

The method of circuit integration is not limited to the LSI, and may be implemented by a dedicated circuit or a general-purpose processor. A field programmable gate array (FPGA) which can be programmed after manufacturing of the LSI or a reconfigurable processor which can reconfigure the connection and settings of circuit cells inside the LSI may be used. The present disclosure may be implemented as digital processing or analog processing.

Further, if an integrated circuit technology that replaces the LSI emerges as a result of advancing in a semiconductor technology or another derivative technology, the technology may naturally be used to integrate the functional blocks. Biotechnology and the like can be applied.

Further, if an integrated circuit technology that replaces the LSI emerges as a result of advancing in a semiconductor technology or another derivative technology, the other technology may naturally be used to integrate the functional blocks. Biotechnology and the like can be applied.

Further, in the present disclosure, the type, arrangement, number, and the like of members are not limited to the above-described embodiment, and the components can be appropriately changed without departing from the spirit of the invention, for example, by appropriately replacing the components with those having the same operational effect.

Further, the configuration of the device according to the present disclosure is an example, and may be realized by a system in which each component is divided into different devices. For example, a function with a heavy processing load can be realized by a cloud server or the like, and a function with a small processing load can be realized by an edge server.

The present disclosure is useful for an acoustic noise suppressing apparatus, an acoustic noise suppressing method, and the like that can suppress deterioration in sound quality of output sound when there is a sudden environmental change or when a plurality of persons talk simultaneously.

What is claimed is:

1. An acoustic noise suppressing apparatus comprising:

a sound pickup circuit that picks up sound, the sound including acoustic noise;

a first suppression circuit that processes the sound, a second suppression circuit that processes the sound in parallel with the first suppression circuit, wherein the first suppression circuit is configured to calculate a first suppression sound signal in which the acoustic noise is suppressed from the sound by using a first algorithm suitable for a plurality of sound sources, and wherein the second suppression circuit is configured to calculate a second suppression sound signal in which the acoustic noise is suppressed from the sound by using a second algorithm suitable for a single sound source; and an output signal selection circuit configured to compare a first amount of sound pressure of the first suppression sound signal with a second amount of sound pressure of the second suppression sound signal, and output only one of the first suppression audio signal and the second suppression audio signal that were calculated in parallel based on the first amount of sound pressure of the first suppression sound signal and the second amount of sound pressure of the second suppression sound signal, wherein the output signal selection circuit selects only one of the first suppression sound signal and the second suppression sound signal having a smaller amount of sound pressure.

2. The acoustic noise suppressing apparatus according to claim 1, wherein the plurality of sound sources or the single sound source include voice of a speaker.

3. The acoustic noise suppressing apparatus according to claim 1, wherein the plurality of sound sources include plural voices of plural speakers and the single sound source include voice of a single speaker.

4. The acoustic noise suppressing apparatus according to claim 1, wherein the output signal selection circuit selects a suppression sound from the first suppression sound signal and the second suppression sound signal based on a characteristic of the first suppression sound signal and the second suppression sound signal, and outputs the selected suppression sound.

5. The acoustic noise suppressing apparatus according to claim 4, wherein the selected suppression sound is more suppressed statistically than a non-selected suppression sound.

6. The acoustic noise suppressing apparatus according to claim 1, wherein the first algorithm includes an ICA (independent component analysis) algorithm, and the second algorithm includes an NLMS (normalized least mean square) algorithm.

7. An acoustic noise suppressing apparatus comprising:

a sound pickup circuit that picks up sound, the sound including acoustic noise; and a processor including a first circuit that processes the sound, and a second circuit that processes the sound in parallel with the first circuit, wherein the processor calculates a first suppression sound signal in which the acoustic noise is suppressed from the sound signal by using a first algorithm suitable for a plurality of sound sources, calculates a second suppression sound signal in which the acoustic noise is suppressed from the sound by using a second algorithm suitable for a single sound source, compares a first amount of sound pressure of the first suppression sound signal with a second amount of sound pressure of the second suppression sound signal, and outputs only one of the first suppression audio signal and the second suppression audio signal that were calculated in parallel based on the first amount of sound pressure of the first suppression sound signal and the second amount of sound pressure of the second suppression sound signal, and wherein the output signal selection circuit selects only one of the first suppression sound signal and the second suppression sound signal having a smaller amount of sound pressure.

8. The acoustic noise suppressing apparatus according to claim 7, wherein the plurality of sound sources or the single sound source include voice of a speaker.

9. The acoustic noise suppressing apparatus according to claim 1, wherein the plurality of sound sources include plural voices of plural speakers and the single sound source include voice of a single speaker.

10. The acoustic noise suppressing apparatus according to claim 6, wherein the processor selects a suppression sound from the first suppression sound signal and the second suppression sound signal based on a characteristic of the first suppression sound signal and the second suppression sound signal and outputs the selected suppression sound.

11. The acoustic noise suppressing apparatus according to claim 10, wherein the selected suppression sound is more suppressed statistically than a non-selected suppression sound.

12. The acoustic noise suppressing apparatus according to claim 7, wherein the first algorithm includes an ICA (independent component analysis) algorithm, and the second algorithm includes an NLMS (normalized least mean square) algorithm.

13. An acoustic noise suppressing method comprising:

picking up sound, the sound including acoustic noise;

performing a first processing, by a first circuit, of the sound;

performing a second processing, by a second circuit, of the sound in parallel with the first processing;

calculating a first suppression sound signal in which the acoustic noise is suppressed from the sound by using a first algorithm suitable for a plurality of sound sources;

calculating a second suppression sound signal in which the acoustic noise is suppressed from the sound by using a second algorithm suitable for a single sound source;

comparing a first amount of sound pressure of the first suppression sound signal with a second amount of sound pressure of the second suppression sound signal; and outputting only one of the first suppression audio signal and the second suppression audio signal that were calculated in parallel based on the first amount of sound pressure of the first suppression sound signal and the second amount of sound pressure of the second suppression sound signal, wherein the output signal selection circuit selects only one of the first suppression sound signal and the second suppression sound signal having a smaller amount of sound pressure.

14. The acoustic noise suppressing method according to claim 13, wherein the plurality of sound sources or the single sound source include voice of a speaker.

15. The acoustic noise suppressing method according to claim 13, wherein the plurality of sound sources include plural voices of plural speakers and the single sound source include voice of a single speaker.

16. The acoustic noise suppressing method according to claim 13, further comprising:

selecting a suppression sound from the first suppression sound signal and the second suppression sound signal based on a characteristic of the first suppression sound signal and the second suppression sound signal; and outputting the selected suppression sound.

17. The acoustic noise suppressing method according to claim 16, wherein the selected suppression sound is more suppressed statistically than a non-selected suppression sound.

* * * * *